United States Patent [19]

Yamakado et al.

[11] Patent Number: 5,960,376
[45] Date of Patent: Sep. 28, 1999

[54] MOVING OBJECT CONTROLLER CONTAINING A DIFFERENTIAL OF ACCELERATION MEASURER

[75] Inventors: Makoto Yamakado, Inayo; Yuzo Kadomukai, Ishioka, both of Japan

[73] Assignee: Hitachi, Ltd., Tokyo, Japan

[21] Appl. No.: 08/886,412

[22] Filed: Jul. 1, 1997

Related U.S. Application Data

[62] Division of application No. 08/018,507, Feb. 17, 1993, Pat. No. 5,726,886.

[30] Foreign Application Priority Data

Feb. 17, 1992 [JP] Japan .................................. 4-029158

[51] Int. Cl.[6] .............................. G01P 1/00; G01P 15/00
[52] U.S. Cl. ...................... 702/141; 73/514.36; 324/162; 701/70; 701/79; 318/276; 364/174
[58] Field of Search ........................... 702/141; 324/162; 73/488, 514.36; 701/37, 70, 79; 303/177, 181, 182; 318/276; 364/174, 474.3

[56] References Cited

U.S. PATENT DOCUMENTS

| | | | |
|---|---|---|---|
| 3,537,307 | 11/1970 | Pliha | 73/178 |
| 3,944,289 | 3/1976 | Jones | 303/21 BE |
| 4,094,199 | 6/1978 | Holdren et al. | 73/5 AB |
| 4,128,010 | 12/1978 | Aske | 73/497 |
| 4,131,020 | 12/1978 | Hugli et al. | 73/517 B |
| 4,145,929 | 3/1979 | Aske | 73/517 B |
| 4,200,168 | 4/1980 | Moog | 180/282 |
| 4,353,259 | 10/1982 | Schneider, Jr. | 73/653 |
| 4,384,269 | 5/1983 | Carlson | 340/67 |
| 4,779,463 | 10/1988 | Woodruff | 73/517 R |
| 4,821,218 | 4/1989 | Potsch | 364/566 |
| 4,950,914 | 8/1990 | Kurihara et al. | 307/10.1 |
| 4,987,783 | 1/1991 | D'Antonio et al. | 73/432.1 |
| 4,999,735 | 3/1991 | Wilner | 361/283.3 |
| 5,163,704 | 11/1992 | Wada | 280/707 |
| 5,267,166 | 11/1993 | Takata et al. | 364/449 |
| 5,268,841 | 12/1993 | Mouri | 364/424.05 |
| 5,336,983 | 8/1994 | Watanabe | 318/651 |
| 5,388,658 | 2/1995 | Ando et al. | 180/197 |
| 5,425,574 | 6/1995 | Sano | 303/97 |
| 5,515,277 | 5/1996 | Mine | 364/424.05 |
| 5,610,817 | 3/1997 | Mahon et al. | 364/424.056 |
| 5,726,886 | 3/1998 | Yamakado et al. | 364/424.1 |

FOREIGN PATENT DOCUMENTS

| | | |
|---|---|---|
| A-0 128582 | 12/1984 | European Pat. Off. . |
| A-41 30970 | 4/1992 | Germany . |
| 3-79921 | 12/1991 | Japan . |

OTHER PUBLICATIONS

Soviet Inventions Illustrated, SX Section, Week 9117, Jun. 12, 1991, Derwent Publications, Ltd., London.

"Development of Acceleration Sensors for Automobiles", published in the Nissan Technical Bulletin No. 23, Dec. 1987.

Saito et al., "Development of an Acceleration Sensor for Antilock Brake Systems", Sumitomo Electrical Tech. Rev., 1993.

Yamakado et al., "A jerk sensor and its application to vehicle motion control systems", Proceedings of 27th Int. Conf. on Supercomputer Applications in the Transportation Industries, Oct. 1994.

*Primary Examiner*—Patrick Assouad
*Attorney, Agent, or Firm*—Antonelli, Terry, Stout & Kraus, LLP

[57] ABSTRACT

In order to control a movable object such as an automobile, the differential of acceleration is derived and used as control information. In order to derive that differential, a value representing the acceleration may be differentiated, but preferably a sensor is provided which generates a direct measurement of the differential of acceleration. In one example of such a sensor, a pendulum has a coil thereon which interacts with the magnetic field of a magnet on a casing supporting the pendulum. A current is supplied to the coil such as to generate a force resisting movement of the pendulum. It is then found that the voltage across the coil corresponds to the differential of acceleration.

36 Claims, 22 Drawing Sheets

FIG. 10
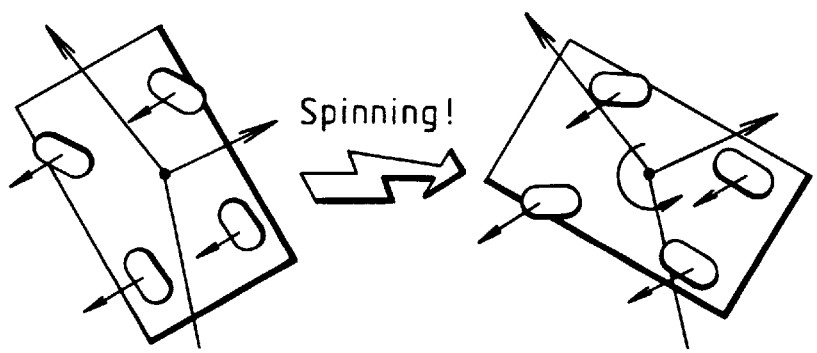
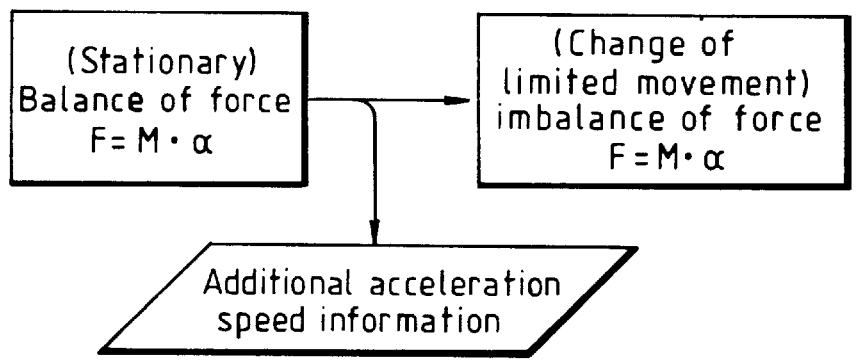
FIG. 21
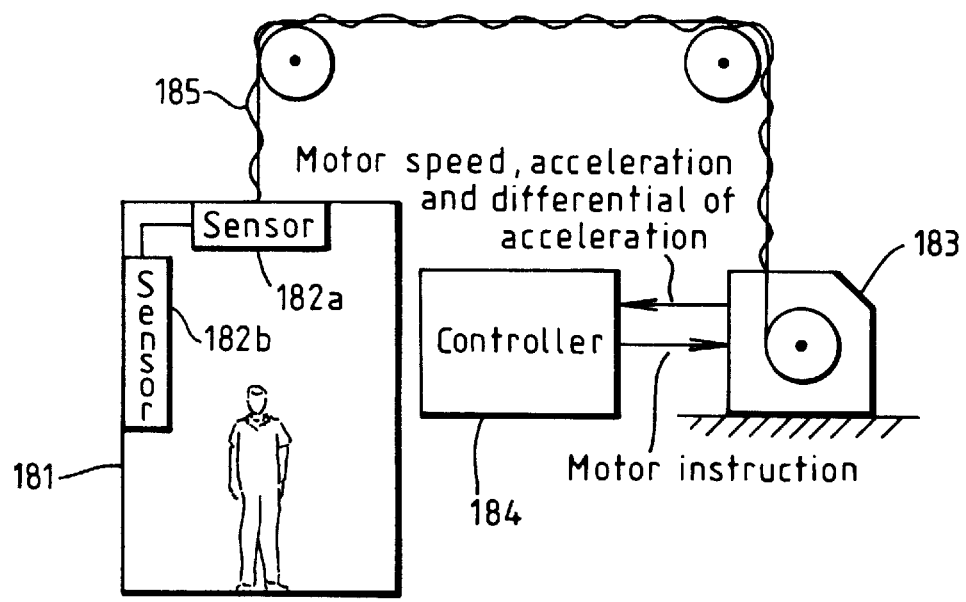

- Change of automobile's movement detected by detecting traverse additional acceleration speed
- Steering the rear wheels by feeding back additional lateral acceleration speed

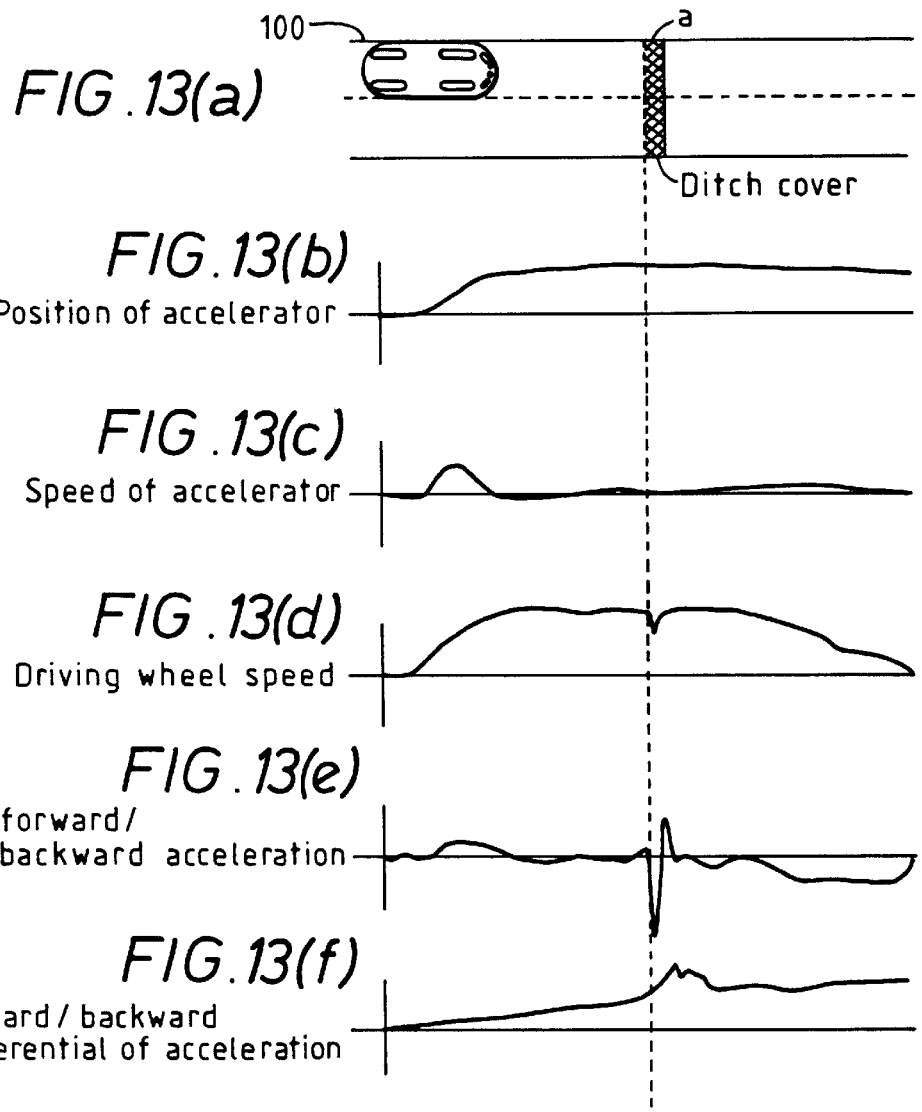
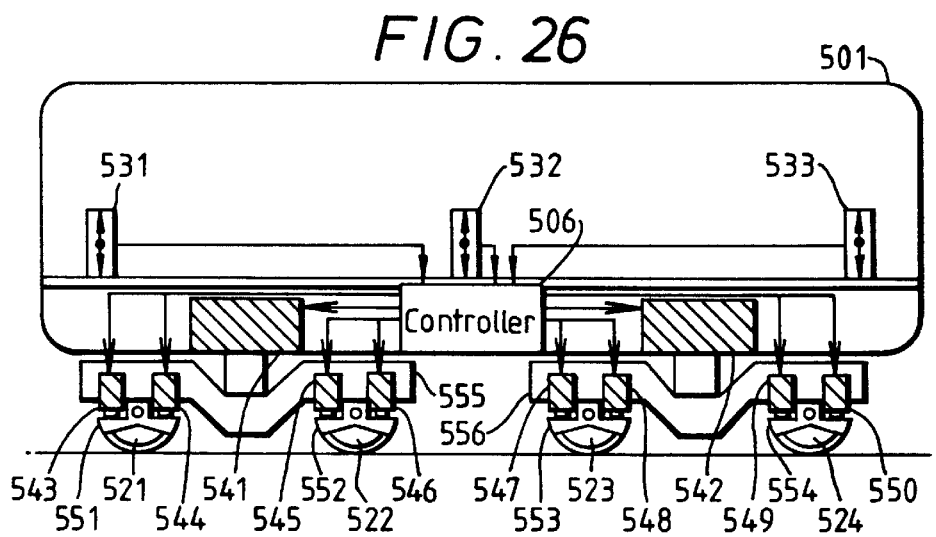

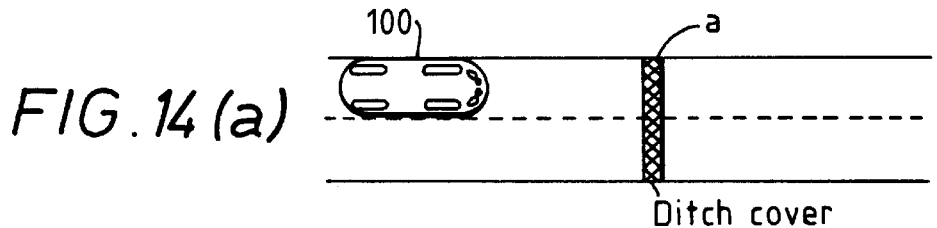
FIG. 14(a)
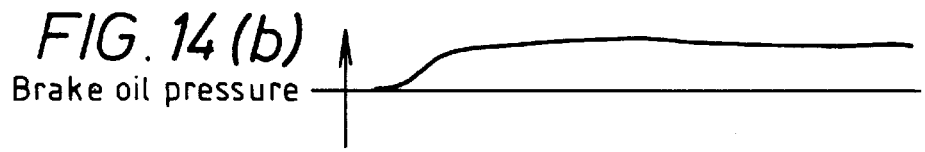
FIG. 14(b) Brake oil pressure
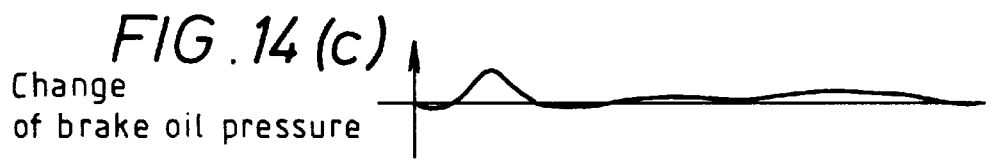
FIG. 14(c) Change of brake oil pressure
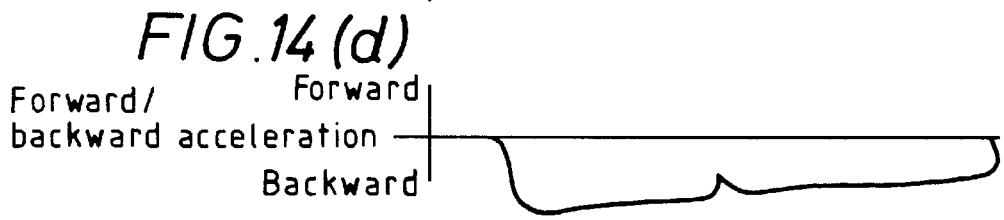
FIG. 14(d) Forward/backward acceleration
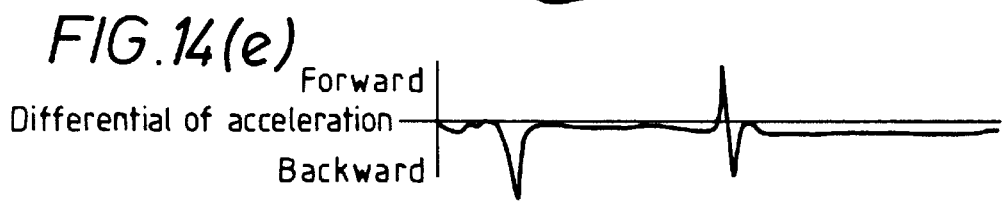
FIG. 14(e) Differential of acceleration
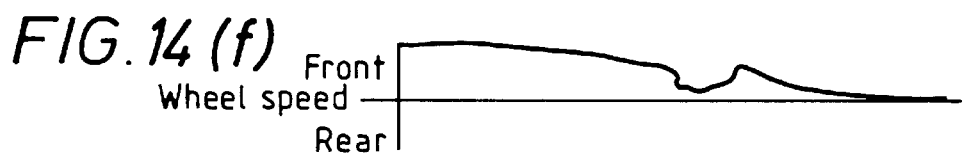
FIG. 14(f) Front Wheel speed Rear
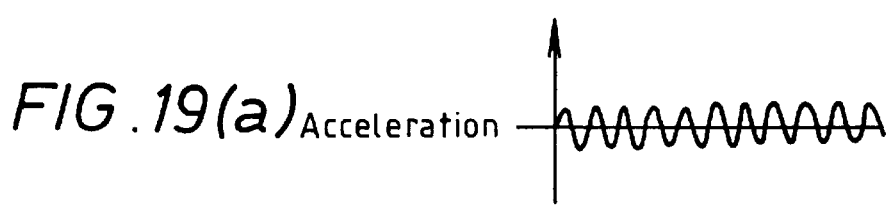
FIG. 19(a) Acceleration
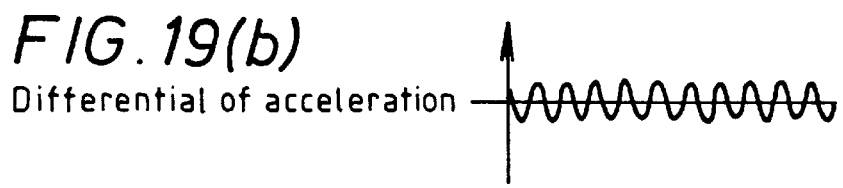
FIG. 19(b) Differential of acceleration

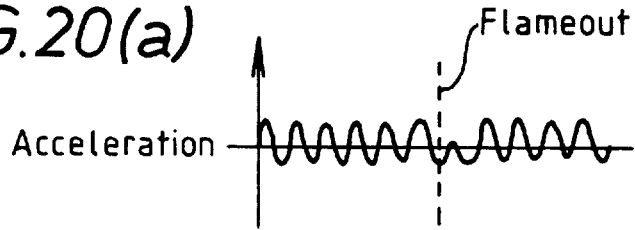
FIG.20(a) Acceleration — Flameout
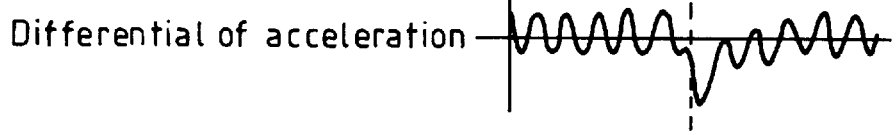
FIG.20(b) Differential of acceleration
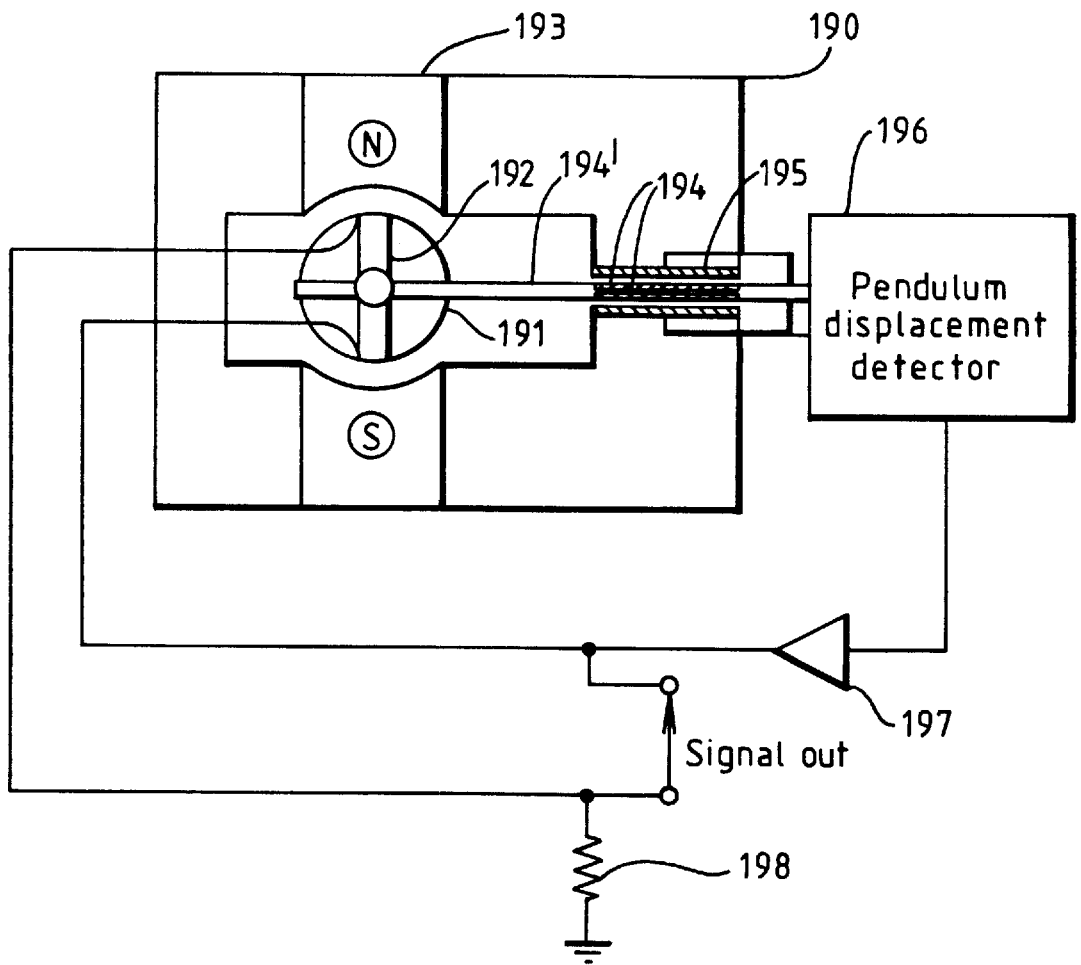
FIG. 22

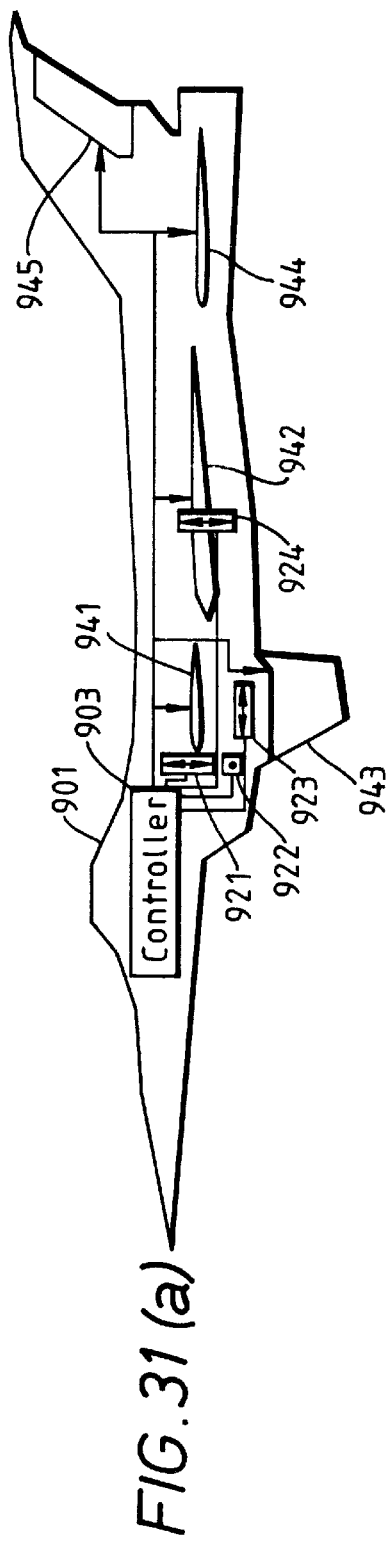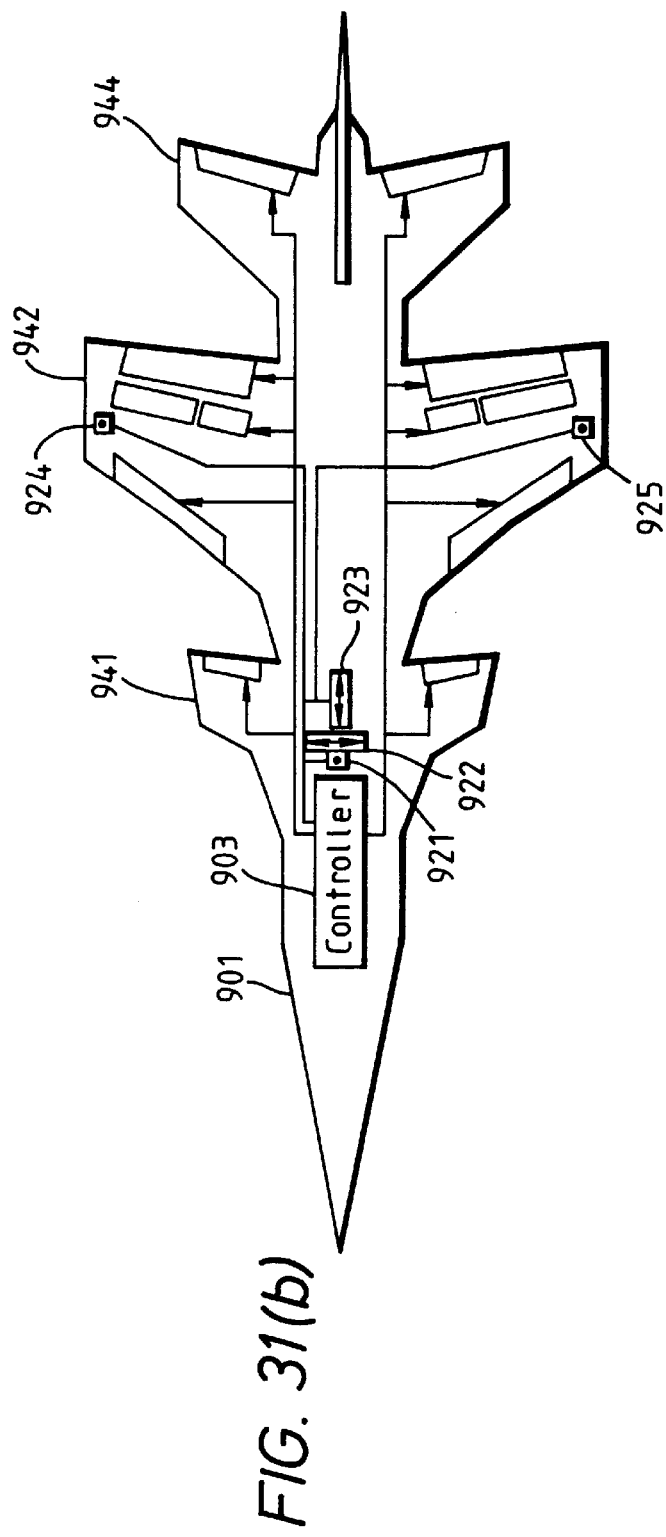
FIG. 31(a)
FIG. 31(b)

MOVING OBJECT CONTROLLER CONTAINING A DIFFERENTIAL OF ACCELERATION MEASURER

This is a divisional of application Ser. No. 08/018,507, filed Feb. 17, 1993, now U.S. Pat. No. 5,726,886.

BACKGROUND OF THE INVENTION

1. Field of the Invention

The present invention relates to a controller for controlling a moving object, such as an automobile, an elevator, etc. The present invention also relates to a method of controlling such a moving object, to a sensor for use in such a controller, and to the combination of a moving object and such a controller.

2. Summary of the Prior Art

In order to control a moving object, such as an automobile, elevator, etc., it is necessary to sense that movement. Existing arrangements are known in which sensors are provided for detecting at least one of: position, velocity, angular velocity, acceleration and angular acceleration. The information derived from such sensors may then be used to control the object. For example, a sensor may detect the acceleration of an object and the information thus obtained may be used to control the acceleration so as to obtain a smoothly increasing velocity.

For a human observer being carried by a moving object, position and velocity are not sensed directly, but are determined only by observing a change relative to stationary objects. However, acceleration is readily sensed. Furthermore, it is suggested in an article entitled "Development of Acceleration Sensors for Automobiles" published in the Nissan Technical Bulletin No. 23, of December 1987, that human beings are particularly sensitive to the rate of change of acceleration, i.e. the differential of acceleration. That article suggested that differential acceleration relates closely to feelings of comfort or discomfort experienced by a human being moving with the object.

In its most general aspect, the present invention proposes that the movement of a movable object be detected, and a value representing a differential of the acceleration relating to that movement be derived. Then, according to the present invention, a control signal is generated in dependence on that value, thereby to control the movable object.

Therefore, a first aspect of the present invention relates to a controller for controlling the movable object, and a method of controlling a moving object. Within this aspect of the present invention, it is possible to derive a value representing the acceleration of the object, which may be achieved by known sensors, and then to derive the differential of that value by, for example, a suitable differentiating means. However, it is preferred within the present invention that a sensor be provided which is capable of determining the differential of acceleration directly.

Therefore, according to a second aspect of the present invention, a sensor is provided with two members movable relative to each other, with one of the members carrying a magnet and the other a coil. Then, if relative movement occurs, a current may be generated which, when passed through the coil, generates a force due to the interaction of the current with the magnetic flux of the magnet. If that current is generated such that the force resists relative movement of the members, it has been found that the voltage across the coil then provides a direct measurement of the differential of acceleration.

Although such a sensor has been derived for use as a part of the controller of the first aspect of the present invention, it is an independent aspect of the present invention.

In such a sensor, one of the members is preferably a pendulum mounted via a pivot axis on the other member. Whilst it is possible for such a pendulum to have two degrees of freedom of movement, so that the differential of acceleration can be derived in more than one axis, the processing circuitry then necessary is complex, and it is preferable that the movement of the pendulum is limited to a single plane. If the differential of the acceleration is needed in more than one direction, then a plurality of such sensors may be provided.

Furthermore, although it is normally easier to mount the coil on the moving part, e.g. the pendulum, it is also possible to mount the magnet thereon, with the coil being mounted on the other member.

Although the present invention proposes that a control signal be generated which is related to the differential of acceleration, it is not limited to controllers in which the differential of acceleration is the only factor used for controlling the moving object. Thus, for example, it is possible to derive acceleration and/or velocity and/or position information relating to the movement of the movable object, and use such information, together with the differential of acceleration, to control the object. Furthermore, the present invention is not limited to linear acceleration, and the differential thereof, but may also be applied to angular acceleration and the differential thereof A controller according to the present invention has many applications. For example, it may be used to control a means for generating a force in a predetermined direction on a movable object. Thus, if the movable object is an automobile, one or more controllers may be provided to permit the following control arrangements:

(i) The derivation of the differential of acceleration in a direction transverse to the automobile may be obtained for controlling the steering of the automobile. Thus, transverse movement (lateral skidding) of the automobile may be detected, and a suitable steering compensation applied.

(ii) The differential of acceleration in a direction longitudinal to the automobile may be detected, for controlling the braking system. Thus, when an automobile is braking, a sudden change in deceleration corresponds to skidding and this may be detected using the differential of acceleration and the braking system controlled to release the wheels, which may be locked in such a skid.

(iii) In a similar way, by detecting the differential of acceleration in a direction longitudinal to the automobile, it is possible to detect whether the wheels of the automobile are skidding due to excess power, with the automobile motor then being controlled so that the wheels again maintain a firm grip.

(iv) By detecting the differential of acceleration in the vertical direction, it is then possible to control an active suspension of the automobile, so as to provide a ride which is more smooth.

Furthermore, in an automobile, mounting devices may be provided for mounting the vehicle engine in the chassis, and the present invention permits those mounting devices to be controlled in dependence on the differential of acceleration of the engine, thereby to smooth the transmission of power from the engine. In particular, such an arrangement can detect mis-firing of the engine.

The present invention may also be applied to an elevator system, in which movement of the elevator cage is detected and the differential of acceleration thereof obtained. Then, the drive to the elevator may be controlled to smooth that movement, thereby reducing passenger discomfort.

Other applications of the present invention include earthquake simulators, railway systems, magnetic levitation vehicle systems, aviation systems, building vibration reduction systems, robotic (manipulator) systems, and systems for moving a platen in a predetermined plane (XY-stage systems).

BRIEF DESCRIPTION OF THE DRAWINGS

Embodiment of the present invention will now be described in detail, by way of example, with reference to the accompanying drawings, in which:

FIG. 10 is a schematic diagram for explaining control of an automobile on the basis of information corresponding to the differential of acceleration;

FIGS. 13(a) to 13(f) illustrate control of an automobile when accelerating, FIG. 13(a) illustrating the movement of the automobile on a road, FIG. 13(b) illustrating the position of the accelerator of the automobile, FIG. 13(c) illustrating the speed of the accelerator, FIG. 13(d) illustrating the driving wheel speed, FIG. 13(e) illustrating the forward/backward acceleration, and FIG. 13(f) illustrating the forward/backwards differential of acceleration;

FIGS. 14(a) to 14(f) illustrate the control of an automobile when breaking, FIG. 14(a) showing the movement of the automobile on a road, FIG. 14(b) showing the brake oil pressure, FIG. 14(c) showing the change of brake oil pressure, FIG. 14(d) showing the forward/backward acceleration of the automobile, FIG. 14(e) showing the forward/backwards differential acceleration of the automobile, and FIG. 14(f) showing the wheel speed;

FIGS. 19(a) and 19(b) illustrate engine vibration in the arrangement of FIG. 18, FIG. 19(a) showing the variation in acceleration and FIG. 19(b) showing the variation in the differential of acceleration;

FIGS. 20(a) and 20(b) are diagrams corresponding to FIGS. 19(a) and 19(b) respectively, but at the time of flameout of the engine;

FIG. 21 shows an elevator control system incorporating the present invention;

FIG. 22 shows a sensor for detecting the differential of rotational acceleration;

FIG. 26 shows a railway vehicle incorporating the present invention;

FIGS. 31(a) and 31 (b) show an airplane incorporating the present invention;

DETAILED DESCRIPTION

Figure 1A:
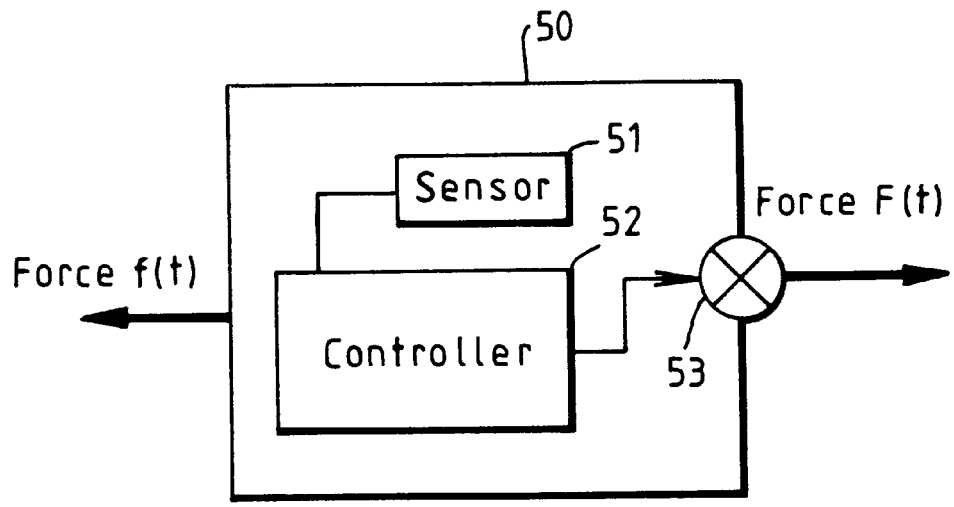
FIGS. 1(a) and 1(b) are schematic diagrams for explaining the general principles of the present invention.

FIG. 1(a) is a schematic diagram showing the overall structure of a movement control system using information relating to the differential of acceleration. The movement control system has an acceleration differential sensor 51 which is fixed to a body 50 and detects the differential of acceleration of the body 50 under external force f(t), a controller 52 for controlling the movement of the body 50, and an actuator 53 for generating force F(t) for acting on the body. The controller 52 controls the movement of the body 50 using the actuator 53 according to the information relating to the differential of acceleration detected by the acceleration differential sensor 51.

Figure 1B:
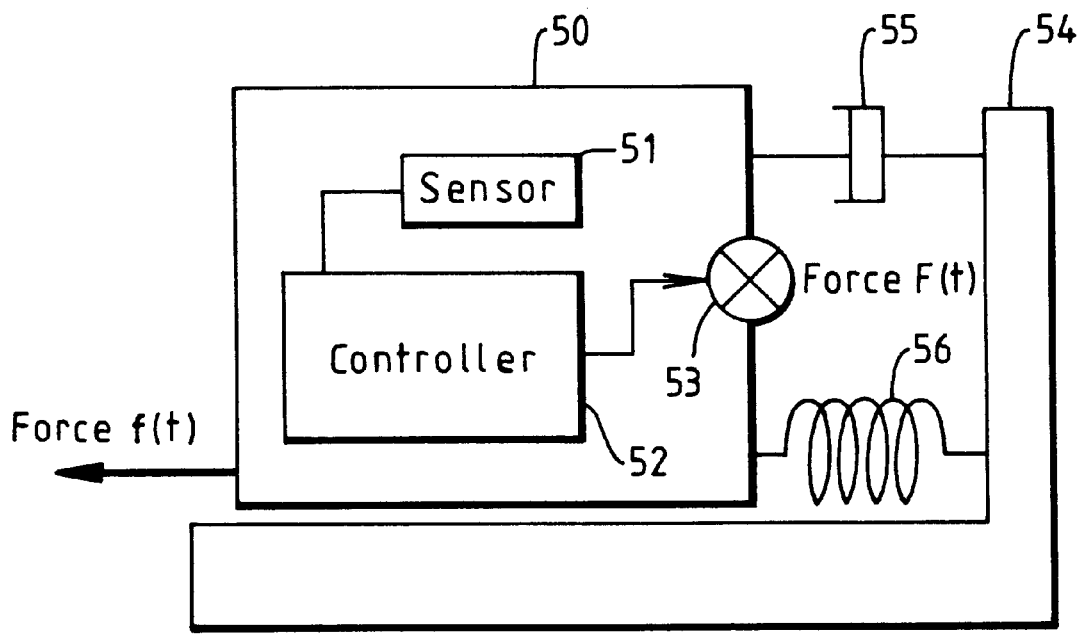

In the movement control system using information relating to the differential of acceleration shown in FIGS. 1(a) and 1(b), a movement will now be considered in which the body 50 is restricted to a virtual fixed surface 54 together with a spring element 56, thus giving the movement configuration shown in FIG. 1(b).

Assuming that the mass of the body shown in FIG. 1b is M, the displacement of the body is $x_o$, the force generated by the actuator 53 is $F_c(t)$, the external force acting on the body 50 is $f_g(t)$, the viscous damping coefficient of a damper element 55 is C, and the spring constant of the spring element 56 is K, the body 50 moves according to the movement equation given by Equation 1.

$$M\frac{d^2 x_o(t)}{dt^2} + C\frac{dx_o(t)}{dt} + Kx_o(t) = f_g(t) - F_c(t) \quad \text{(Equation 1)}$$

Figure 2A:
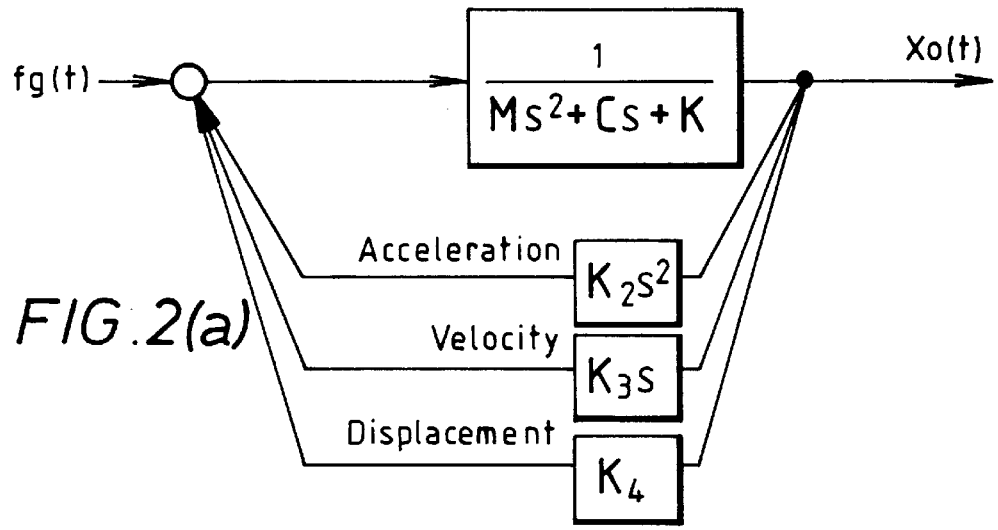
FIGS. 2(a) to 2(c) are block diagrams illustrating control rule arrangements which may be used in the present invention.

When considering position control in the movement model shown in FIG. 1(b), the control rule by the controller 52 may be assumed to have a transmission function such as shown in FIG. 2(a), represented in Equation 2 below.

$$G_x = K_2 s^2 + K_3 s + K_4 \quad \text{(Equation 2)}$$

In Equation 2, $K_2$, $K_3$, and $K_4$ represent feedback gain constants of acceleration, velocity and displacement respectively. The transmission function between the external force and displacement is then given by Equation 3 below.

$$\frac{X}{F_g}(s) = \frac{1}{(M+K_2)s^2 + (C+K_3)s + (K+K_4)} \quad \text{(Equation 3)}$$

Equation 3 shows the acceleration feedback functions actively to increase the mass under position control, and the velocity feedback functions actively to increase the damping value under position control, and the position feedback functions actively to increase the rigidity under position control. Equation 3 also shows that, by selecting the three gain constants, the movement characteristics can be changed freely.

Next, the velocity control in the movement model shown in FIG. 1(b) will be considered. When both sides of Equation 1 are differentiated with respect to time t, Equation 4 is obtained.

$$M\frac{d^3 x_o(t)}{dt^3} + C\frac{d^2 x_o(t)}{dt^2} + K\frac{dx_o}{dt} = \frac{df_g(t)}{dt} - \frac{dF_c(t)}{dt} \quad \text{(Equation 4)}$$

Equation 3 is substituted as shown in Equation 5 below then Equation 6 is obtained.

$$v_o(t) = \frac{dx_o(t)}{dt} f_g^1(t) = \frac{df_g(t)}{dt} F_c^1(t) = \frac{dF_c(t)}{dt} \quad \text{(Equation 5)}$$

$$M\frac{d^2 v_o(t)}{dt^2} + C\frac{dv_o(t)}{dt} + Kv_o(t) = f_g^1(t) - F_c^1(t) \quad \text{(Equation 6)}$$

Figure 2B:
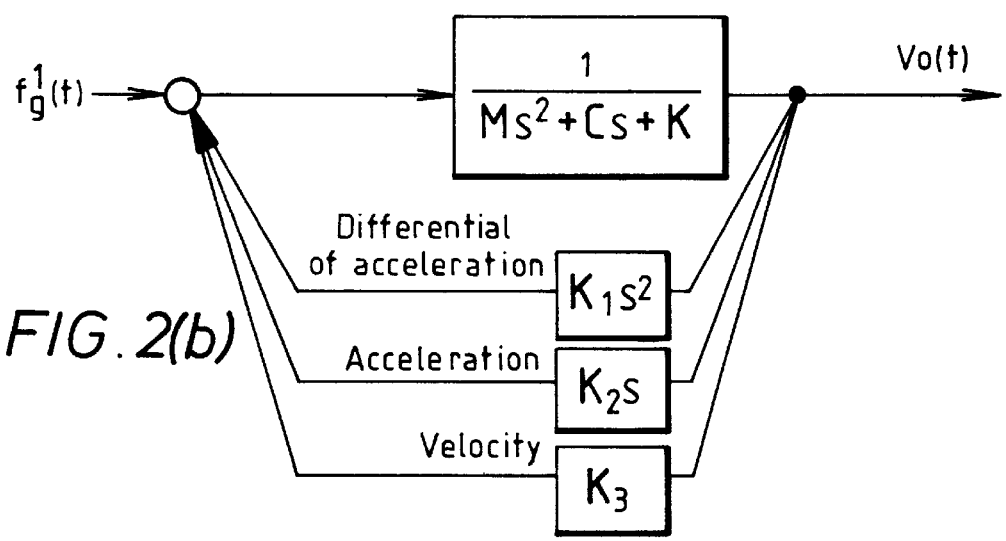

FIG. 2(b) shows a block diagram corresponding to the case where the control rule of the controller 52 is a transmission function given by Equation 7 below.

$$G_v = K_1 s^2 + K_2 s + K_3 \quad \text{(Equation 7)}$$

In Equation 7, $K_1$, $K_2$, and $K_3$ represent feedback gain constants of the differential of acceleration, acceleration and velocity respectively. The transmission function between the external force and velocity obtained from this block diagram is then given by Equation 8 below.

$$\frac{V}{F_g^1}(s) = \frac{1}{(M+K_1)s^2 + (C+K_2)s + (K+K_3)} \quad \text{(Equation 8)}$$

Equation 8 shows that the differential of acceleration feedback actively increases the mass under velocity control, the acceleration feedback actively increases the damping value under velocity control, and the velocity feedback actively increases the rigidity under velocity control. Equation 8 also shows that, by suitably selecting the three gain constants, the movement characteristics can be changed freely.

Next, acceleration control in the movement model shown in FIG. 1(b) will be considered. When both sides of Equation 7 are differentiated with respect to time t, Equation 9 is obtained.

$$M\frac{d^3 v_o(t)}{dt^3} + C\frac{d^2 v_o(t)}{dt^2} + K\frac{dv_o(t)}{dt} = \frac{df_g^1(t)}{dt} - \frac{dF_c^1(t)}{dt} \quad \text{(Equation 9)}$$

When Equation 10 is substituted as shown in Equation 11 below, then Equation 12 is obtained.

$$a_o(t) = \frac{dv_o(t)}{dt} f_g^2(t) = \frac{df_g^1(t)}{dt} F_c^2 = \frac{dF_c^1(t)}{dt} \quad \text{(Equation 10)}$$

$$M\frac{d^2 a_o(t)}{dt^2} + C\frac{da_o(t)}{dt} + Ka_o(t) = f_g^2(t) - F_c^2(t) \quad \text{(Equation 11)}$$

Figure 2C:
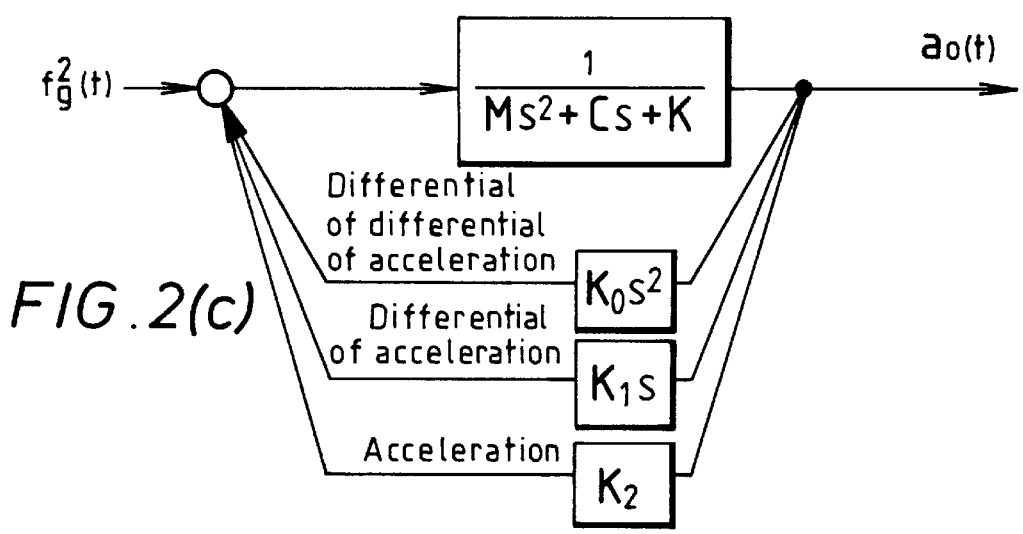

FIG. 2(c) shows a block diagram corresponding to the case where the control rule of the controller 52 is a transmission function given by Equation 12 below.

$$G_g = K_0 s^2 + K_1 s + K_2 \quad \text{(Equation 12)}$$

In Equation 12, $K_0$, $K_1$ and $K_2$ represent feedback gain constants of differential of the differential of acceleration, differential of acceleration, and acceleration, respectively. The transmission function between the external force and acceleration obtained from this block diagram is then given by Equation 13 below.

$$\frac{a}{F_g^2}(s) = \frac{1}{(M+K_0)s^2 + (C+K_1)s + (K+K_2)} \quad \text{(Equation 13)}$$

Equation 13 shows that the differential of the differential of acceleration feedback actively increases the mass under acceleration control, and the differential of acceleration feedback actively increases the damping value under acceleration control, and the acceleration feedback actively increases the rigidity under acceleration control. Equation 14 also shows that, by suitably selecting the three gain constants, the movement characteristics can be changed freely.

The movement control based on each of position, velocity, and acceleration is described above. By adding information relating to the differential of acceleration, which is a new physical value reflected by the body movement status, to the conventional control methods using only position, velocity and acceleration information, the mass is actively changed under velocity control and the damping value is actively changed under acceleration control, so that the efficiency of control can be increased. (Information relating to the differential of the differential of acceleration can be used as a first order differential circuit output of the output of the additional acceleration speed sensor.)

Figure 3:
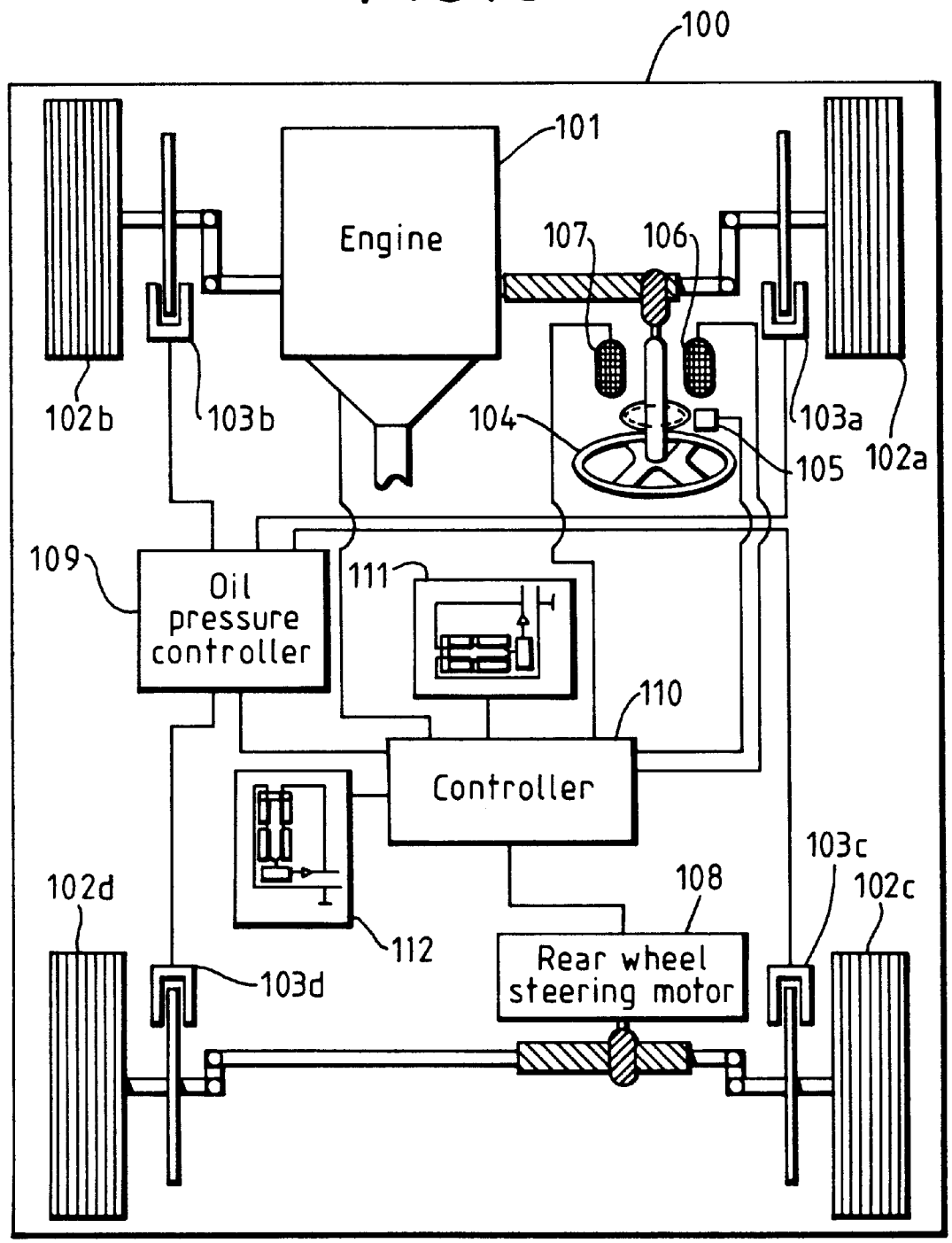
FIG. 3 is a schematic diagram of an automobile incorporating the present invention.

A first example of the application of the present invention to an automobile control system will now be described with reference to FIGS. 3 to 15. FIG. 3 shows the overall configuration of the control system for the movement of the automobile, which is an example of a movable object, in which sensors measuring the differential of acceleration are used.

The automobile 100 has four road wheels which are steerable. The automobile includes an engine 101 (including the transmission), road wheels 102, a brake 103 for each road wheel 102, a steering wheel 104, a steering angle sensor 105, an accelerator pedal mechanism 106, a brake pedal mechanism 107, a rear wheel steering motor 108, an oil pressure controller 109, a controller 110, an acceleration differential sensor 112 used to detect the differential of lateral acceleration, and an acceleration differential sensor 111 used to detect the differential of the forward/backward (longitudinal) acceleration. The configurations of the traverse acceleration differential sensor 112 and the forward/backward (longitudinal) acceleration sensor 111 are as shown in FIGS. 4 to 9. Those sensors can also detect acceleration.

Figure 4:
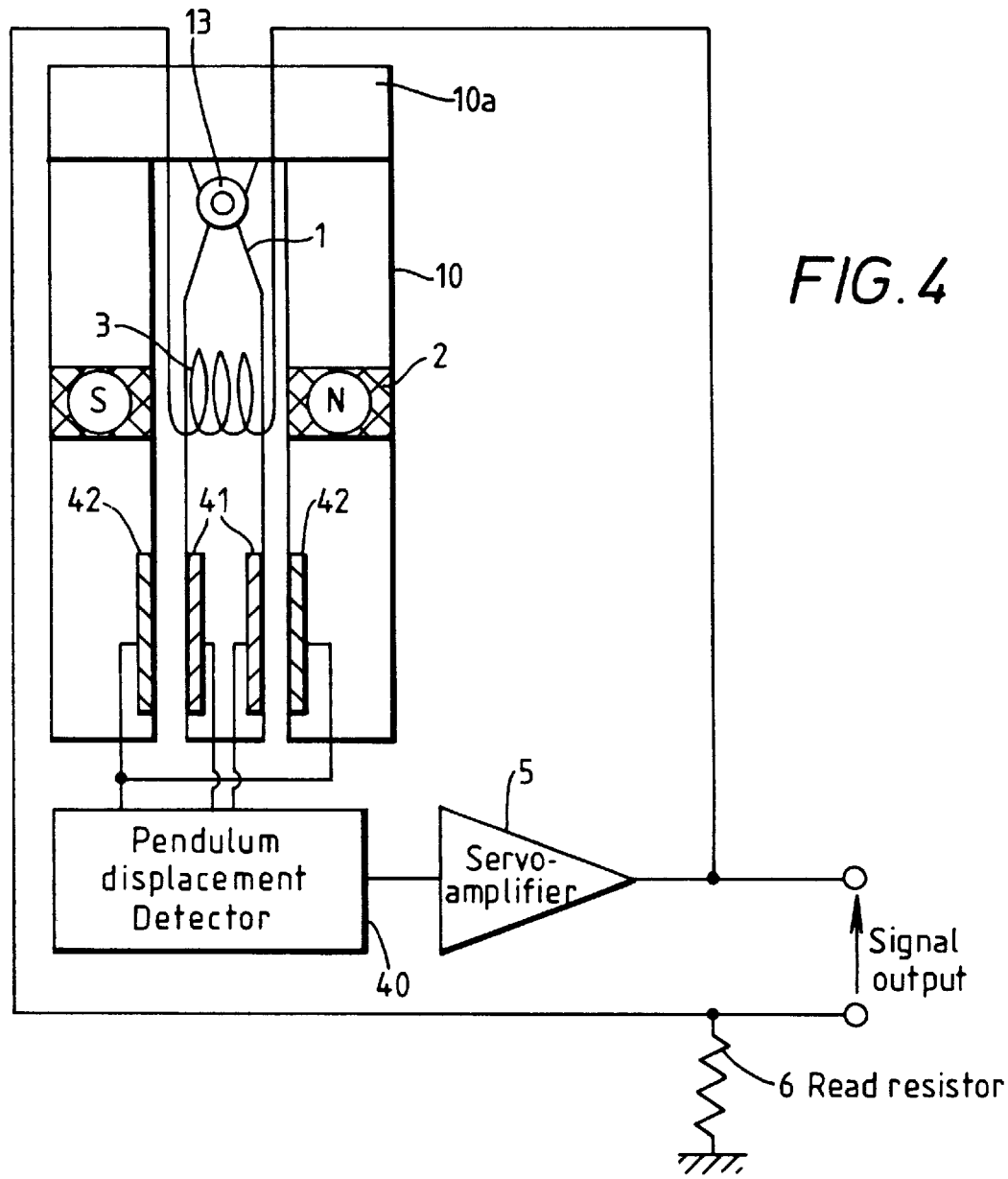
FIG. 4 shows the configuration of a first embodiment of an acceleration differential sensor which may be used in the automobile of FIG. 3.
Figure 5:
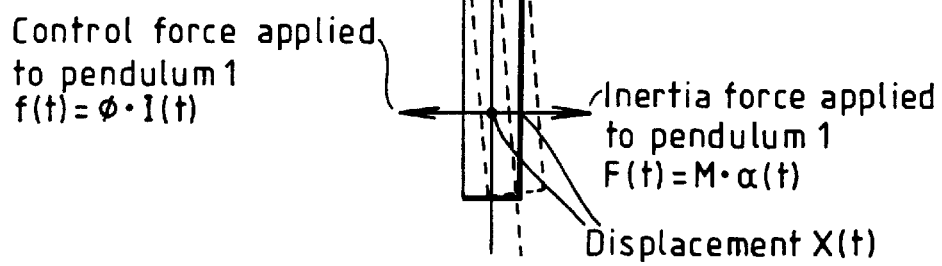
FIG. 5 is a diagram showing the forces applied to the pendulum of the sensor of FIG. 4.

FIG. 4 shows the overall configuration of a first embodiment of an acceleration differential sensor 111 or 112 which may be used in the example of an automobile control system shown in FIG. 3. This acceleration differential sensor, as shown in FIG. 4, consists of a pendulum 1 attached to a casing 10a using a joint 13 providing one degree of freedom of movement (i.e. the pendulum 1 is constrained to move in one plane only). A coil 3 is fixed to the pendulum 1, and a movable electrode 41 is attached at or adjacent the free end (moving direction) of the pendulum 1. A casing 10 supports a magnet 2 so that the magnet is adjacent the coil 3, and an electrode 42 is fixed to the casing 10, facing the movable electrode 41.

A pendulum displacement detector 40 is used to detect the displacement of the pendulum 1 from its equilibrium position, and a servo-amplifier 5 is connected in series to the output side of the pendulum displacement detector 40 and the output of the servo-amplifier 5 is fed to one end of coil 3. A read resistor 6 is connected such that one end thereof is grounded and the other end is connected to the coil 3. The information relating to the differential of acceleration thus detected then corresponds to the terminal voltage of coil 3 as shown in FIG. 4.

As mentioned above, the pendulum 1 has one degree of freedom of movement (in the plane of the paper in FIG. 4), so the sensor detects movement, and the differential of acceleration of that movement in that direction. The movable electrode 41 and electrode 42 fixed to the casing 10 form two pairs of electrodes representing two plate capacitors. The electrostatic capacitance C of such a plate capacitor is inversely proportional to the size of the gap between the capacitor plates, and is given by Equation 14 below.

$$C = \epsilon \cdot \frac{S}{d} \quad \text{(Equation 14)}$$

In Equation 14, ϵ is the permittivity of air, S is the electrode area, and d is the gap size. Thus, the displacement of the pendulum 1 can be detected from the change C in the electrostatic capacitance between the two capacitors each formed by a movable electrode 41 and a fixed electrode 42.

The pendulum 1 supports the coil 3. When a current flows in this coil 3, the current generates a magnetic flux and the pendulum experiences a force generated by the interaction of that magnetic flux with the magnetic field of the magnet 2 fixed to the casing 10. Hence, the pendulum 1 can be maintained substantially at its equilibrium position regardless of the magnitude of the external force. This is achieved by controlling the current flowing in the coil 3 so that the change ΔC in the electrostatic capacitance between the two capacitors detected by the servo-amplifier 5 is substantially zero.

Assume now that the acceleration differential sensor is fixed to a moving object, such as the automobile in the example of FIG. 3. If the mass of the pendulum 1 is M, and a transverse acceleration α(t) (i.e in the effective direction of the sensor) to the left in FIG. 4 is sensed by the sensor at a time t, then an inertial force of F(t)=M.α(t) is applied to the pendulum 1 to the right in FIG. 5. The movement of the pendulum 1 is then given by Equation 15 below.

$$M \cdot \frac{d^2 x(t)}{dt^2} = F(t) - f(t) \quad \text{(Equation 15)}$$

In Equation 15, M is the mass of the pendulum 1, x(t) is the displacement from the equilibrium position of the pendulum 1 at time t, F(t) is the inertial force acting on the pendulum 1, f(t) is a controlling force generated through the position feed-back. The controlling force f(t) is proportional to the current I(t) flowing in the coil 3, which is given by Equations 16 and 17.

$$F(t) = \phi \cdot I(t) \quad \text{(Equation 16)}$$

$$\phi = 2\pi r B N \quad \text{(Equation 17)}$$

In Equations 16 and 17, ϕ is an electromagnetic interlinkage coefficient, r is the radius of coil 3, B is the magnetic flux density of the magnet 2, and N is the number of turns of the coil 3.

When the controlling force f(t) corresponds to F(t) it changes with time so that pendulum 1 may be held at the equilibrium position. Then the left side of the Equation 15 becomes zero. As a result, Equation 18 holds.

$$F(t) - M \cdot \alpha(t) = f(t) = \phi \cdot I(t) \quad \text{(Equation 18)}$$

Thus, the acceleration to be detected by the acceleration differential sensor is given by Equation 19 as follows:

$$\alpha(t) = \frac{\phi}{M} \cdot I(t) \quad \text{(Equation 19)}$$

The acceleration mentioned above can be detected by measuring the current flowing in coil 3. On the other hand, if the differential of acceleration to be detected by the acceleration differential sensor is assumed to be η(t), then Equation 20 holds, as shown below.

$$\eta(t) = \frac{d\alpha(t)}{dt} = \frac{\phi}{M} \cdot \frac{dI(t)}{dt} \quad \text{(Equation 20)}$$

Figure 6:
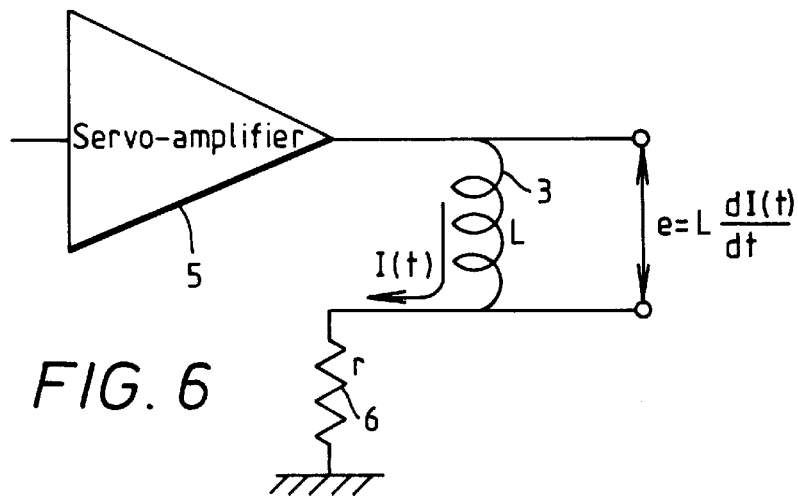
FIG. 6 is a circuit diagram of part of the sensor of FIG. 4.

The circuit equation for the current flowing in the coil 3 is, as can be seen from FIG. 6, then given by Equation 21.

$$e = L \cdot \frac{dI(t)}{dt} \quad \text{(Equation 21)}$$

In Equation 21, L is the inductance of the coil 3. Thus, the differential of acceleration to be detected by the acceleration differential sensor η(t) is given by Equation 22 as shown below.

$$\eta(t) = \frac{\phi}{M} \cdot \frac{e}{L} \qquad (\text{Equation 22})$$

The differential of acceleration mentioned above can be measured by detecting the voltage across the coil 3.

The configuration of the acceleration differential sensor of the first embodiment is such that the pendulum 1 is displaced when an acceleration is applied in the direction in which the pendulum 1 moves. This displacement is detected by the displacement detector 40 as a voltage signal and is amplified in the servo-amplifier 5. The servo-amplifier 5 converts the voltage signal into a current instruction This current is then supplied to the coil 3 attached to the pendulum 1.

Hence, a force is preferably generated between the coil 3 and the fixed magnetic electrode 42, which force provides a displacement force on the pendulum 1 which balances the force due to the movement of the object to which the sensor is attached. Therefore, the output of the displacement detector 40 becomes substantially zero. The displacement of pendulum 1 is prevented automatically. The current flowing in the coil 3 at this time, as mentioned above, is proportional to the acceleration applied. The voltage across the coil 3 is proportional to the differentiated value of the current, that is, the differential of acceleration.

Figure 7:
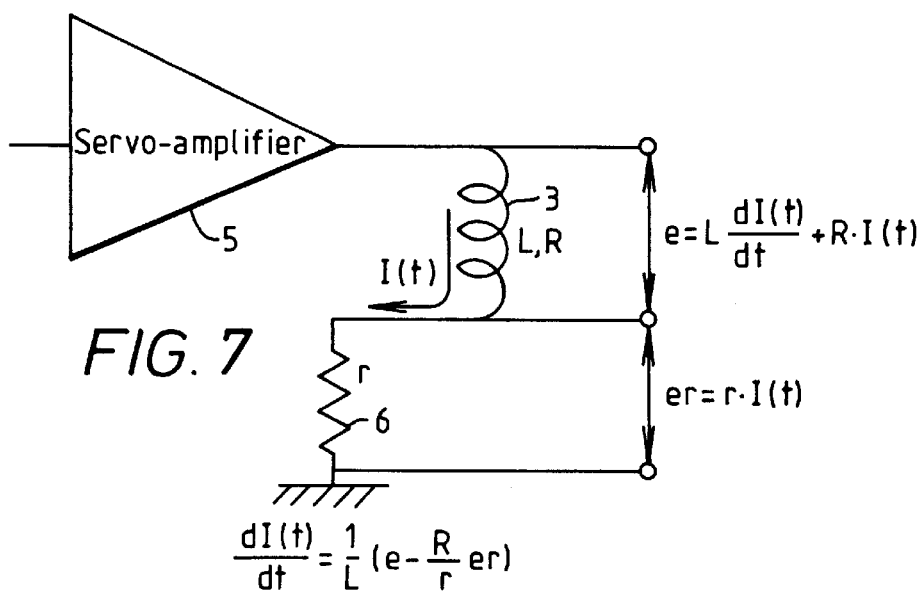
FIG. 7 is a circuit diagram of a modification of part of the sensor of FIG. 4.

FIG. 7 shows a method for deriving information relating to the differential of acceleration when the coil 3 has a resistance R. Equation 23 applies for the circuit shown in FIG. 5.

$$e = R \cdot I(t) + L \cdot \frac{dI(t)}{dt} \qquad (\text{Equation 23})$$

In Equation 23, e is the voltage across the coil 3, R is the resistance of the coil 3, and L is the inductance of the coil 3. If the current flowing in the coil 3 is assumed to pass through the read resistor 6 as shown in FIG. 7, then Equation 24 holds.

$$e_r = r \cdot I(t) \qquad (\text{Equation 24})$$

Thus, the differential of acceleration can be detected by the acceleration differential sensor in the same way as in FIG. 6, by measuring the voltage across the coil 3. The voltage across the read resistor 6 is then given by Equation 25.

$$\eta(t) = \frac{\phi}{M} \cdot \frac{e - \frac{R}{r} \cdot e_r}{L} \qquad (\text{Equation 25})$$

Figure 8:
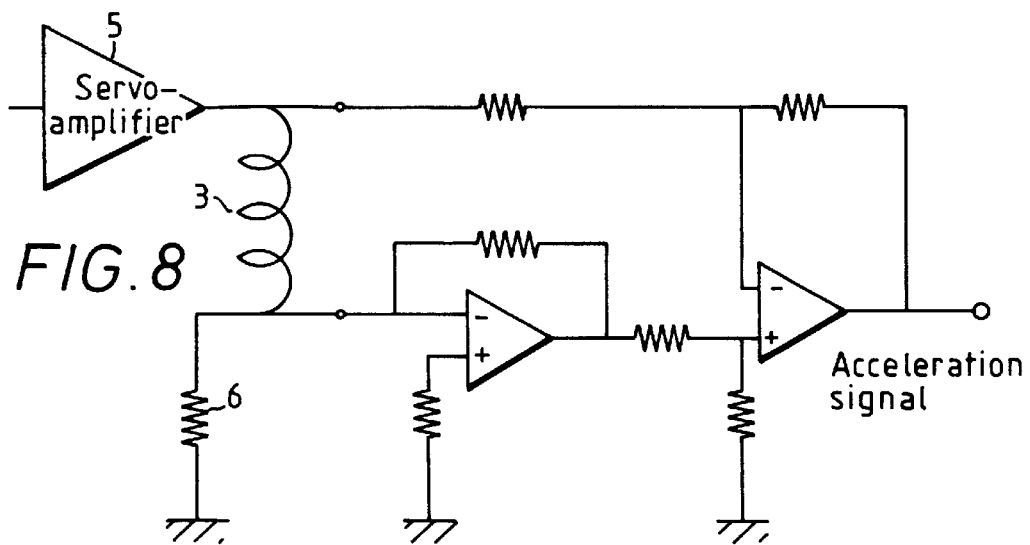
FIG. 8 is a circuit diagram showing signal processing circuitry for the sensor of FIG. 4.

FIG. 8 shows the signal processing block configuration of the acceleration differential sensor represented by Equation 25. An operational amplifier is used in the signal processing block. This configuration enables the differential of acceleration that affects the acceleration differential sensor to be detected even when the resistance of coil 3 cannot be ignored.

Figure 9:
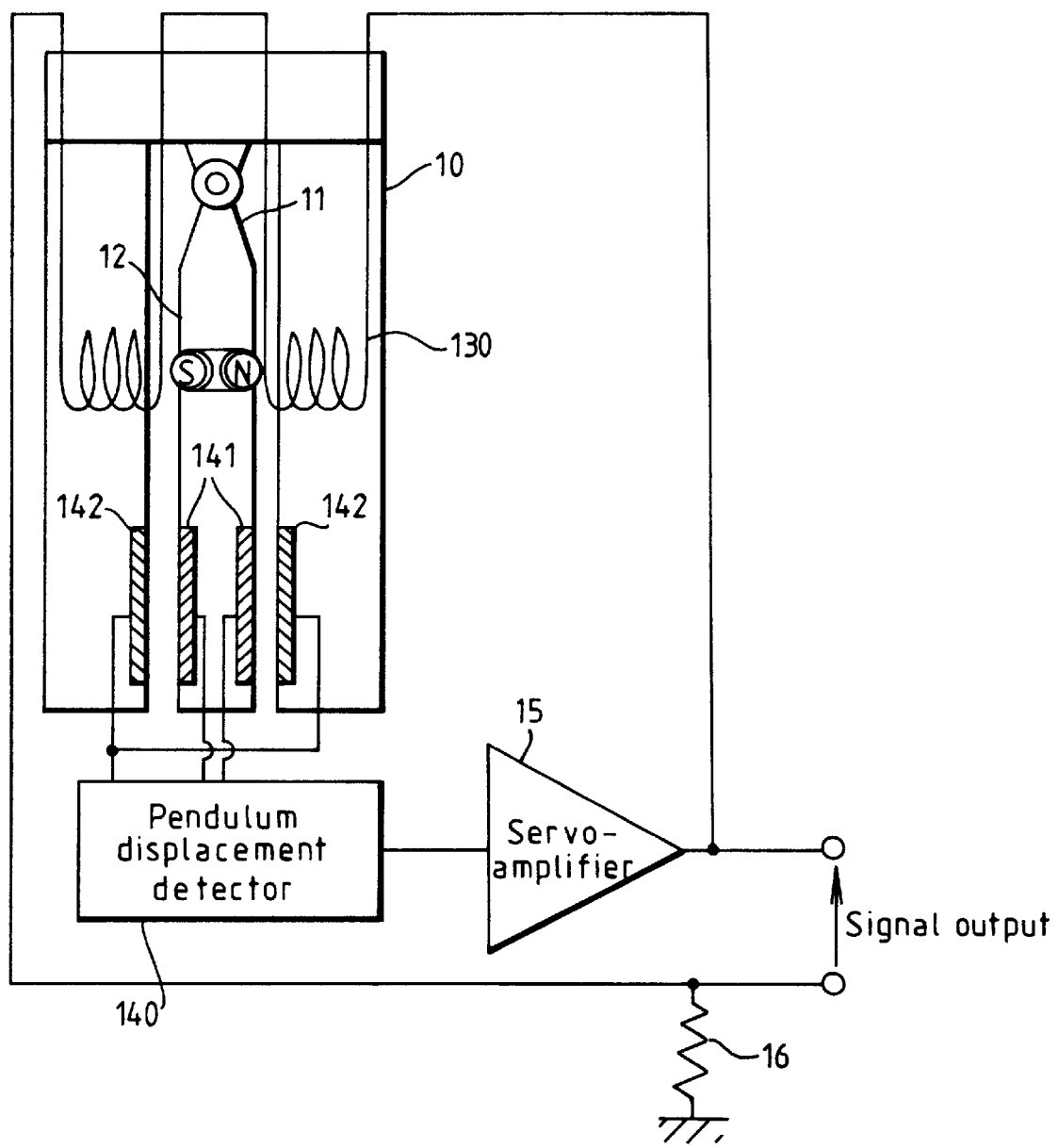
FIG. 9 is a second embodiment of an acceleration differential sensor which may be used in the automobile of FIG. 3.

FIG. 9 shows the overall configuration of a second embodiment of an acceleration differential sensor. The configuration is generally similar to that shown in FIG. 4. The sensor consists of a pendulum 11, a magnet fixed to the pendulum 11, a movable electrode 141, a casing 10, a coil 130 fixed on the casing 10, a fixed electrode 142, a pendulum displacement detector 140 used to detect the displacement of the pendulum from the equilibrium position, a servo-amplifier 15, and a read resistor 16. Thus, this embodiment differs from that of FIG. 4 in that the coil 13 is attached to the casing 10, whilst the magnet 12 is fixed to the pendulum 11. With a sensor according to this embodiment, and in the same way as the sensor in FIG. 4, information relating to the differential of acceleration corresponds to the terminal voltage of the coil 13 shown in FIG. 9.

In the acceleration differential sensors shown in FIGS. 4 and 9, the magnets 2 and 12 may be replaced with a permanent magnet or an electromagnet respectively that keep the magnetic flux density at a fixed level.

In this embodiment, a method using the difference of the electrostatic capacity, which is constructed with a pendulum and casing, is used for displacement detection of the pendulum However, the present invention is not restricted to this. For example, the pendulum displacement may be detected optically by using a light emitting element, lens, and photo detector.

Furthermore, as is evident from Equations 21 and 25, it is not necessary to take into account the materials or structural characteristics (Young modulus, cross-section moment, etc.) of the pendulum 1, so that the differential of acceleration can be detected more accurately.

Furthermore, Equation 26 below can be derived from Equations 19 and 24.

$$a(t) = \frac{\phi}{M} \cdot \frac{1}{r} e_r \qquad (\text{Equation 26})$$

Therefore, the terminal voltage $e_r$ of the reading resistors 6 and 16 is a value proportional to the current, i.e. acceleration.

As mentioned above, the acceleration differential speed sensor shown in this embodiment can detect acceleration and the differential of acceleration at the same time.

In the above embodiment of the acceleration differential sensor, the detection direction is limited to one axis. However, when it is necessary to detect the differential of acceleration in many axial directions, and the number of parts and cost must be reduced, a multi-axis acceleration differential sensor can be achieved by using the arrangement discussed below.

A pendulum is used with a magnet or coil aligned in each axial direction. The pendulum can be displaced in many axial directions according to acceleration in many axial directions. Also, a coil or magnet is mounted to be aligned in each axial direction at a location where force in each axial direction is generated independently in the magnet or coil of the pendulum. Then, a displacement detector detects independently the displacement in each axial direction from the reference opposition of the pendulum. A servo amplifier in each axial direction controls the current flowing through the coil in each axial direction. Hence, the displacement is detected by the displacement detector in each axial direction, and the current flowing through the coil in each axial direction is used to compensate for displacement in each axial direction of the pendulum in each axial direction which is generated by the acceleration acting on the pendulum in each axial direction so that the displacement is substantially zero. In such an arrangement, the differential of acceleration acting on the pendulum in each axial direction can be detected from the induced electromotive force generated across the coil in each axial direction, such detection being e.g. by an induced electromotive force detector in each axial direction.

A thin plate-like cantilever may be used in an acceleration differential sensor of the present invention to replace the pendulum of the first or second embodiment. The cantilever is arranged so that its wider plane is set vertically to the detection direction. The sensor is used to detect directly a physical amount proportional to the change in the acceleration. If the cantilever is located in a magnetic field, the magnetic flux changes according to the change in the position of the cantilever. Therefore, the differential of acceleration, which is the rate of change of the acceleration, can be detected by detecting the electromotive force generated, using a suitable pick-up coil. The electromotive force is proportional to the differentiated value of the magnetic flux in accordance with the rules of electromagnetic inductance. Thus, the voltage generated may be output from the sensor. In this method, however, accurate detection of the differential of acceleration is more difficult to achieve. This is because bending of the cantilever due to acceleration is used to detect the differential of acceleration and various nonlinear factors then affect the result.

Returning now to FIG. 3, the four wheels of the automobile 100 are steered, the rpm of the engine changes, or the brake 103 is used when the driver operates the steering 104, accelerator 106, or brake pedal mechanism 107, respectively, in the same way as when driving a normal automobile. However, under normal driving conditions, the performance of the automobile can be improved by use of the present invention, as will now be described.

According to this example of the present invention, the rear steering motor 108, the engine 101, and the oil pressure controller 109 are controlled respectively by controller 110 making use of information corresponding to the traverse and longitudinal (forward/backward) differential of acceleration. In this way, it becomes possible to control the automobile even at the limits at which it is difficult to control the automobile movement manually.

FIG. 10 illustrates an example of control of an automobile on the basis of information corresponding to the differential of acceleration when the movement of automobile 100 suddenly changes, for example due to skidding of the automobile due to a change in road conditions. When an automobile is turning normally, there is a balance of forces between the centrifugal force M and the surface reaction F. If the movement of the automobile changes due to a sudden change of road conditions, etc., the balance of the forces is broken. In the conventional control of the movement of an automobile at such a time, the time at which this balance of forces breaks cannot be detected and the automobile cannot be controlled appropriately; it is only controlled in the same way as for normal driving.

Acceleration and differential of acceleration correspond to information that a driver can sense and recognize, in addition to visual information. Of that information, the change of acceleration, that is, the differential of acceleration, is useful to control automobiles when the balance of forces referred to above is broken; the automobile is controlled by detecting the differential of acceleration. Thus, both the acceleration information and the differential of acceleration information can be used for controlling the movement of an automobile.

Figure 11A:
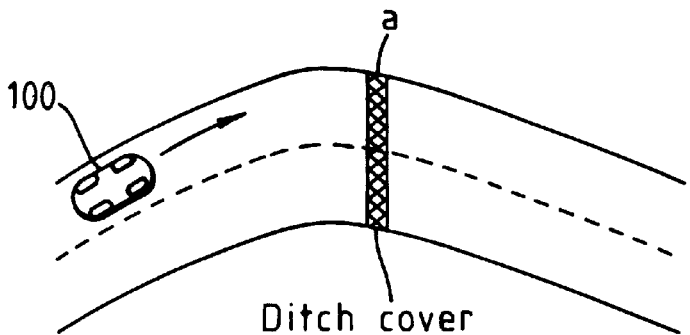
FIGS. 11(a) to 11(e) illustrate transverse slipping of an automobile, FIG. 11(a) showing the movement of an automobile on a road, FIG. 11(b) showing the change in steering angle of the automobile, FIG. 11(c) showing the change in steering angle speed, FIG. 11(d) showing the change in lateral acceleration, and FIG. 11(e) showing the differential of lateral acceleration.
Figure 11B:
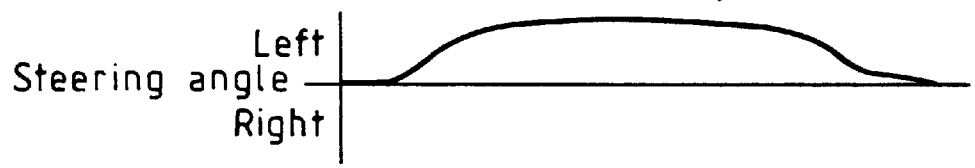
Figure 11C:
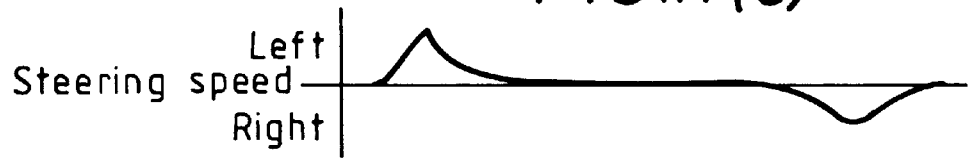
Figure 11D:
Figure 11E:
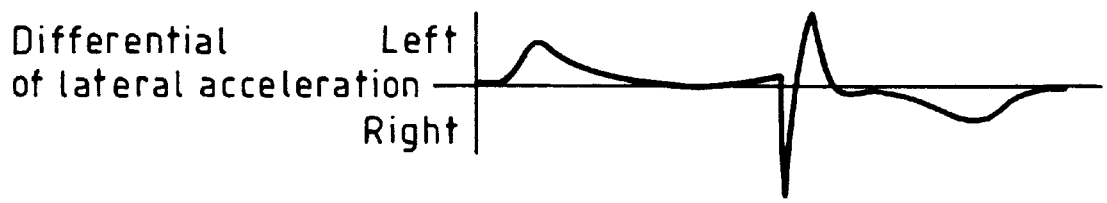

FIGS. 11(a) to 11(e) show how to detect the traverse slipping of an automobile on the basis of the differential of acceleration transverse to the longitudinal axis of the automobile 100 (hereinafter differential of transverse acceleration). In FIG. 11(a), the road is assumed to have a gentle right turn. When a ditch crosses the road at point a in FIG. 11(a), both the ground contact area and the friction coefficient will change at that point for an instant. The angle at which the automobile 100 is being steered (hereinafter "steering angle") (see FIG. 11(b), the change in that angle (hereinafter "steering angle speed") (see FIG. 11(c), the transverse acceleration of the automobile (see FIG. 11(d), and the differential of transverse acceleration of the automobile (see FIG. 11(e)) change when the automobile 100 runs on such a road, as is discussed below.

In general, the cornering force acting on the tires of the automobile 100 increases in proportion to the size of the steering angle. When the steering angle is fixed (steering angle speed is zero), the centrifugal force accompanying the turning of the automobile, and the cornering force are balanced as long as the road conditions remain the same.

When automobile 100 passes point (a) at which the ditch crosses the road, the automobile 100 skids laterally for an instant. This lateral skid causes the transverse acceleration of the automobile 100 to be reduced for a short time, but the steering angle remains fixed. As a result, a large peak is detected in the differential of transverse acceleration. This is why the moment when the automobile 100 begins to skid can be detected from the steering angle speed and the differential of transverse acceleration of the automobile 100, by detecting the differential of transverse acceleration for the increased steering angle.

Figure 12A:
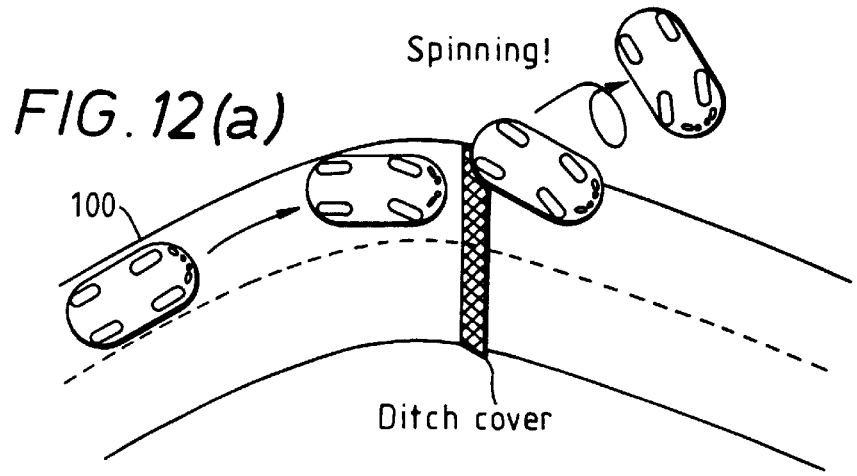
FIGS. 12(a) and 12(b) show the correction of steering of an automobile in dependence on the differential of transverse acceleration, FIG. 12(a) showing the spinning which can occur and FIG. 12(b) showing the control of the rear road wheels to avoid spinning.
Figure 12B:
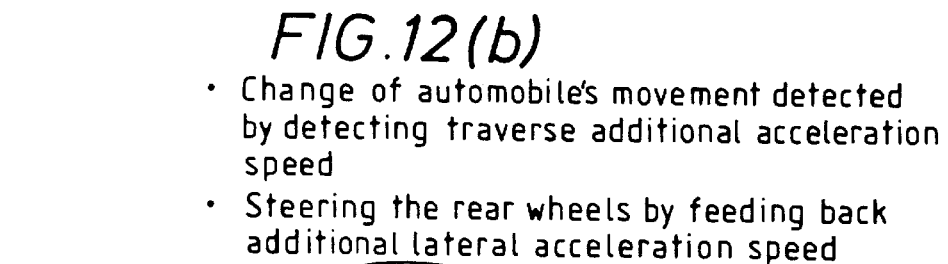

FIGS. 12(a) and 12(b) show an example of the present invention which seeks to prevent excessive changes of the movement of the automobile 100 by correcting the steering of the rear road wheels 102 using the steering mechanism in dependence on the differential of transverse acceleration. Excessive changes of movement of the automobile 100 can thus be prevented by making use of both the steering angle speed and the differential of transverse acceleration information to turn the rear wheels 102 slightly in the same steering direction as the front wheels 102.

FIGS. 13(a) to 13(f) and 14(a) to 14(f) show methods for detecting a longitudinal (forward/backward) slipping of the wheels, making use of the forward/backward differential of acceleration. FIG. 13 relates to backward slipping of the wheels at the time the automobile starts or accelerates and FIG. 14(a) relates to forward slipping (skidding) when the automobile brakes.

In FIG. 13(a), the road on which the automobile 100 is moving is considered to be straight, but a ditch crosses at point (a) and the ground contact area and the friction coefficient will change for an instant when the automobile passes the point. The position of the accelerator 106, the speed of the accelerator, the driving wheel speed, the forward/backward acceleration, and the forward/backward differential of acceleration of the automobile 100 when the automobile is accelerating on such a road, are shown in FIGS. 13(b) to 13(f) respectively.

In general, the traction force acting on the tires of the wheels of the automobile 100 increases in proportion to the engine torque. Hence, when the accelerator is not at its undepressed position, the traction force and the road reaction when the tires are driven by engine 101 are balanced as long as the road conditions remain the same. However, when the automobile passes the ditch at point (a), the driving wheel 102 may begin to slip backwards relative to the road surface. Then, the forward/backward acceleration of automobile 100 is reduced for an instant irrespective of the position of the accelerator 106. A large peak is then detected in the forward/backward differential of acceleration of the automobile 100.

Therefore, the time when the driving wheels 102 begin to slip can be detected by detecting the movement of the accelerator and by detecting the forward/backward differential of acceleration in relation to the change in accelerator position. As a result, the output of the engine 101 and the idling of the driving wheels 102 can be reduced. Thus, excessive changes of the movement of automobile 100 can be prevented if the controller 110 makes use of information corresponding to the forward/backward acceleration. In a conventional control unit which seeks to prevent the driving wheels 102 from idling, it is difficult to prevent such idling because the conventional unit determines that idling has started when the RPM value of the driving wheels 102 increases more than that of any undriven wheels 102. It takes a long time to detect such idling of the driving wheels 102, and the driving wheels 102 must be braked to stop the idling. Once idling has started, the idling does not stop because of the inertial moment of wheels 102.

In this example of the present invention, information corresponding to the forward/backward differential of acceleration is used. This enables the moment when the wheels 102 begin idling or the moment when the maximum friction force is exceeded to be detected readily. Therefore, the engine torque can be reduced before driving wheels 102 begin idling, and the slipping of the driving wheels 102 can be reduced when starting or accelerating the automobile 100, without using the brake 107 of the driving wheels 102. Hence, excessive changes of automobile 100 movement can be prevented.

The backward slipping (skidding) of the wheels of the automobile 100 can also be detected when the automobile reduces speed using the forward/backward differential of acceleration information, as shown in FIGS. 14(a) to 14(f). In this example, as shown in FIG. 14(a) the road on which the automobile 100 is moving is assumed to be straight and a ditch crosses at point (a), and the ground contact area and the friction coefficient change for an instant when the automobile passes the ditch. The brake oil pressure, the change in brake oil pressure, the accelerator speed, the speed of wheels 102, the forward/backward acceleration, and the forward/backward differential of acceleration of the automobile 100 when the automobile reduces speed during running on such a road are shown in FIGS. 14(b) to 14(f). In general, the force acting on the tires of wheels 102 increases in proportion to the brake torque. Hence, if the brake oil pressure is not zero, the force generated when brake 107 is used for braking the tires and the road reaction are balanced as long as the road conditions remain the same. However, when the automobile passes a ditch at point (a), the driving wheels may lock (the speed thereof at this time is zero). Thus, the deceleration is reduced for an instant while the brake oil pressure is not zero, and a large peak can be detected in the forward/backward differential of acceleration of the automobile 100. Therefore, the time when the wheels 102 lock can be detected by detecting the brake oil pressure and by detecting the forward/backward differential of acceleration of the automobile in relation to the change of brake oil pressure. Excessive changes in the movement of automobile 100 can thus be prevented by having the brake oil pressure controller 109 controlled by the controller 110 to reduce the brake oil pressure at the time of slipping and hence prevent the locking of the wheels 102 using information relating to the forward/backward differential of acceleration. In the anti-lock unit for wheels which is used in conventional anti-skid braking systems (ABS), an estimate is made of when the RPM value of the driving wheels 102 decreases sharply relative to the automobile speed, the latter being estimated from the RPM value of trailing (undriven) wheels 102. This is used to determine when the wheels are locked. Therefore, it takes a long time to detect whether or not the wheels are locked. In addition, because the estimate of the speed of the automobile is not accurate, it is impossible to control the speed of the automobile accurately.

In the examples of the present invention described above, information corresponding to the forward/backward differential of acceleration is used. So, the time when wheels 102 start to lock, or the time when the maximum friction force is exceeded can be detected. The brake oil pressure can be reduced before the wheels 102 are fully locked, so that wheels 102 lock less frequently under braking, thereby preventing undesirable changes of the movement of automobile 100.

Figure 15:
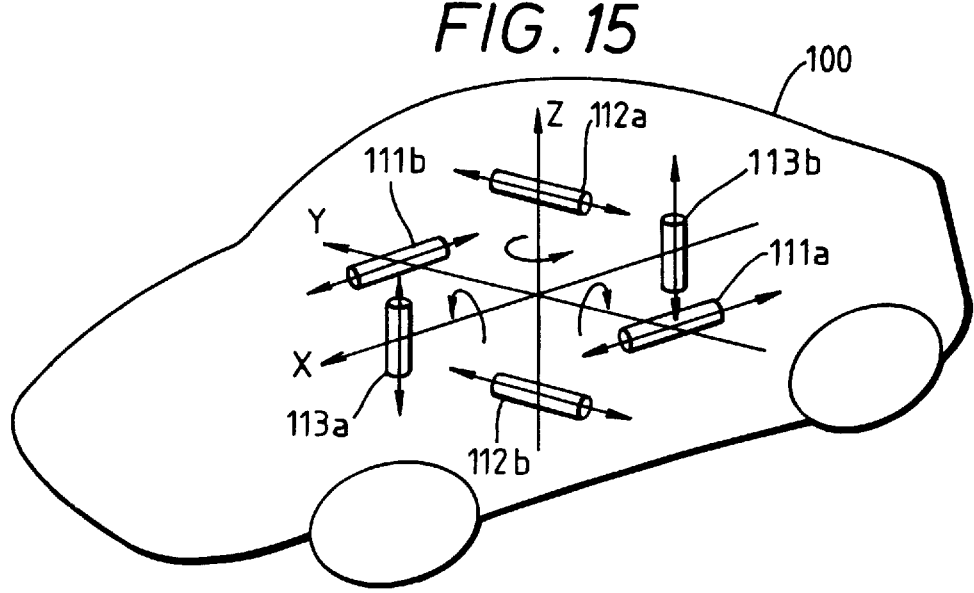
FIG. 15 is a schematic diagram of an automobile having six acceleration differential sensors.

Control methods for the automobile 100 using information relating to the differential of acceleration in the forward, backward, right, and left directions have been described above in the three examples. However, the automobile 100 can make movements in six degrees of freedom; three translation movements of forward/backward, right/left, and up/down and three rotation movements of rolling, yawing, and pitching. So, six acceleration differential sensors 111a, 111b, 112a, 112b, 113a, 113b are provided to collect information corresponding to each of those six degrees of freedom, as shown in FIG. 15. The six sensors form three pairs, with the sensors of each pair detecting changes along the same linear axis. Hence, translational movements give the same output from the corresponding pair, whilst rotation movements give different (opposed) outputs. The output of each sensor, or pair of sensors, can be used to detect differential of acceleration information for a corresponding degree of freedom.

When the movement of automobile 100 is controlled using information relating directly to the differential of acceleration, instantaneous changes acting on the automobile 100 can be detected. Thus, any changes of automobile movement within a suitable range can be detected immediately and the automobile can be controlled so that the maximum value of the friction force of the tires is maintained. At the same time, control can be corrected appropriately to changes in the automobile movement caused by disturbances which are not expected nor desired.

In the three examples discussed above, only information relating to the differential of acceleration and driving information are used to explain how automobiles may be controlled according to the present invention. Of course, more sophisticated control is possible us.ing various other types of information such as acceleration wheel speed information, etc., which have been used in conventional automobile movement control, in addition to information relating to the differential of acceleration information.

Figure 16:
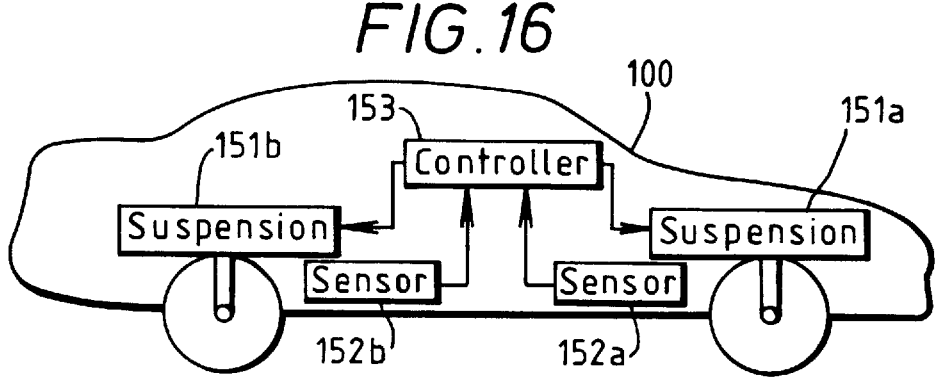
FIG. 16 shows an automobile having suspension control.

FIG. 16 shows a second application of this invention. In this application of the present invention, acceleration differential sensors are used to control the ride comfort of an automobile. In this case, an automobile 100 has a variable suspension mechanism 151a, 151b. Other components of the automobile may be the same as those shown in FIG. 3. The automobile 100 has a plurality of acceleration differential sensors (although only two acceleration differential sensors 152a and 152b near the front wheels and the rear wheels respectively are shown in FIG. 16). It is assumed that the acceleration output of the "ith" acceleration differential sensor is $G_i$ and the differential of acceleration output is $J_i$. It can be noted that the acceleration value $G_i$ can be derived from the voltage across resistor 6 in the sensor of FIG. 2, and the differential of acceleration value $J_i$ obtained from the voltage across coil 3 for any sensor.

The evaluation function $\psi_s$ for ride comfort is then given by Equation 27 below $$\psi_s = \sum_i [d_i|G_i| + e_i|J_i|] \qquad \text{(Equation 27)}$$

In Equation 27, $d_i$ and $e_i$ are weighing constants at the "ith" observation point and may be selected according to the desires of the driver and/or passenger. The ride comfort can be optimized if the controller 153 controls the suspension mechanism 151*a*, 151*b* so that the comfort evaluation functions are minimized.

The controller 153 controls the suspension mechanism 151*a* and 151*b*. However, when the controller 153 is provided with a function for calculating the riding comfort evaluation function from information relating to the acceleration and the differential of acceleration at each observation point of the automobile 11 and for outputting calculation results, it can be used as an evaluation testing machine for evaluating the riding comfort of the automobile 100.

Figure 17:
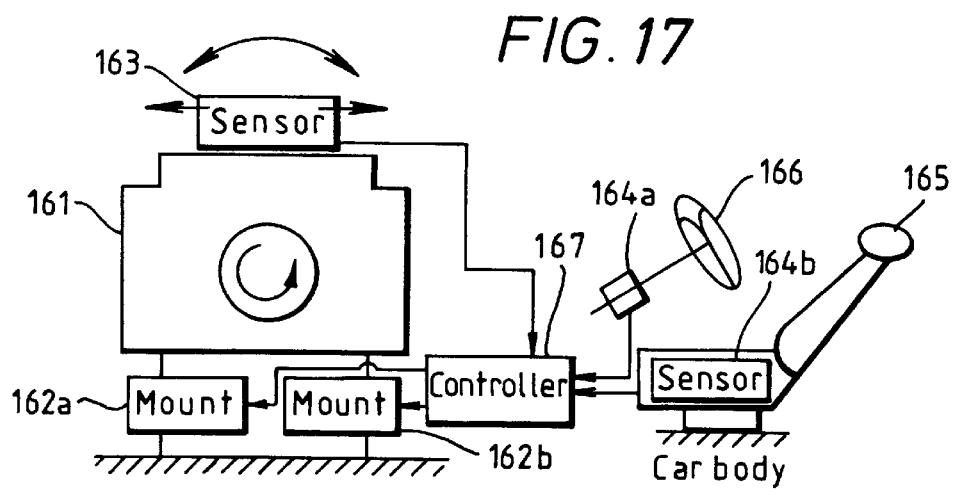
FIG. 17 is a schematic diagram of an engine vibration control arrangement using acceleration differential sensors.

FIGS. 17 to 20 show another application of this invention. FIG. 17 shows a configuration in which acceleration differential sensors are used to control ride comfort in the automobile and to reduce engine vibration. In this case, the automobile is assumed to have a variable engine mounting mechanism. In this application of the present invention, an acceleration differential sensor 163 is mounted on the engine 161, the engine being supported by engine mounts 162*a* and 162*b*. Two further acceleration differential sensors 164*a* and 164*b* are mounted on the steering wheel 166 and in the seat 165 for the driver. The acceleration differential sensors 163, 164*a*, 164*b* supply signals to a controller 167 which controls the engine mounts 162*a* 162*b*. Other parts of the configuration may be the same as those in the arrangement shown in FIG. 16. An acceleration value can be derived from the voltage across resistor 6 in the sensor of FIG. 4, and the differential of acceleration value obtained from the voltage across coil 3.

The engine 161 and body are provided with a plurality of additional acceleration detectors (only three sensors 163, 164*a*, 165*b* are shown in FIG. 17. It is assumed that the acceleration output of the "jth" acceleration differential sensors is $G_j$ and the differential of acceleration output is $J_j$. Then riding comfort evaluation function $\psi_m$ is defined by Equation 28 below, in the same way as Equation 27.

$$\psi_m = \sum_j [d_j|G_j| + e_j|J_j|] \qquad \text{(Equation 28)}$$

In Equation 28 $d_j$ and $e_j$ indicate weighting constants for information relating to the acceleration and differential of acceleration at the "j"th observation point and may be tuned in accordance with the desires of the driver and/or passenger.

The comfort can be optimized by having controller 167 control the suspension mechanism so that comfort evaluation function $\psi_m$ is minimized.

Figure 18:
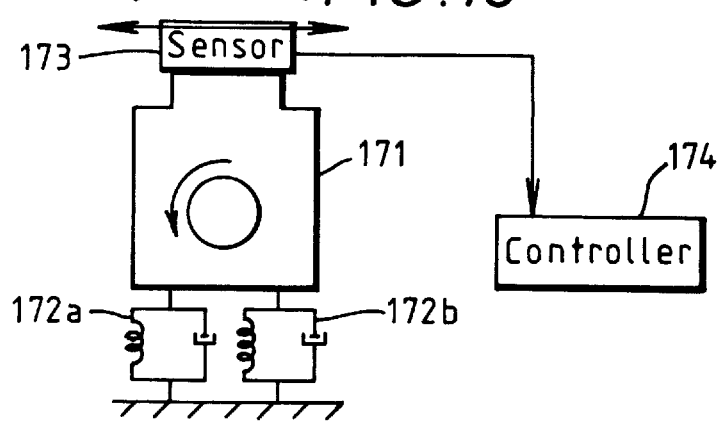
FIG. 18 shows a further engine mounting arrangement using acceleration differential sensors.

FIG. 18 shows an application of the present invention in which an acceleration differential sensor 171 is used to detect misfiring of the engine 171 of an automobile. Because fuel combustion occurs intermittently in the engine 171, the engine torque changes synchronously with combustion. The reaction of this change in torque makes the engine vibrate, and vibration is transmitted to the automobile body through engine mounts 172*a*, 172*b* causing the body of the automobile to vibrate. This vibration of the engine 171 is forcible vibration caused by the change in torque which is synchronized with the fuel combustion frequency. Thus, the combustion status of the engine can be detected by detecting this vibration using controller 174. FIG. 19 shows changes of vibration acceleration and differential of acceleration occurring in the engine rolling direction during normal fuel combustion. FIG. 20 shows the changes of vibration acceleration and differential of acceleration occurring in the engine rolling direction when a misfire occurs in the engine. A misfire occurs at point (m) in FIG. 20. Then, a change occurs in the engine acceleration and a large peak is observed in the differential of acceleration. Misfiring of the engine 171 can be detected by detecting those two signals, and carrying out a suitable filtering calculation. Thus, engine vibration can be reduced if the controller 174 then controls the ignition of the engine 171 in dependence on this information.

The controller 174 controls the variable engine mount mechanisms 172*a* and 172*b*. However, when the controller 174 has a function for calculating the riding comfort evaluation function from information relating to the acceleration and differential of acceleration at each observation point of the automobile 100 and for outputting calculation results, it can be used as an evaluation testing machine for evaluating the riding comfort of the automobile 100.

It should be noted that the controlling methods for automobiles mentioned above can be applied to other vehicles, or indeed any other moving object.

FIG. 21 shows yet another application of this invention. In this example, an acceleration differential sensor is used to control ride comfort in an elevator. An elevator cabin 281 is suspended by a wire rope 185. A motor 183 moves the rope 185, and is controlled by a controller 184. Acceleration differential sensors 182*a* and 182*b* are attached to the elevator cabin 181. In this configuration, the speed of the elevator cabin is defined as V when the cabin is moved up/down by motor 183. As in the arrangement of FIG. 16, an acceleration value can be derived from the voltage across resistor 6 in the sensor of FIG. 2, and the differential of acceleration value obtained from the voltage across coil 3.

The information relating to the differential of acceleration is inputted into the controller 184 and used as control instructions for the motor 183. For a plurality of acceleration differential sensors (e.g. sensors 182*a*, 182*b*), if it is assumed that the acceleration output of the "k"th acceleration differential sensor is $G_k$ and the differential of acceleration output is $J_k$ and the rotational speed of the motor is V, a riding comfort evaluation function $\psi_a$ may then be defined according to Equation 29.

$$\Psi_e = \left| a \cdot V - \sum_k [b_k \cdot |G_k| + C_k \cdot J_k|] \right| \qquad \text{(Equation 29)}$$

In Equation 29, a is a weighting constant for the elevator lifting and lowering speed, and $b_k$ and $c_k$ are weighting constants for the information relating to the acceleration and differential of acceleration at the "i"th observation point are tuned in accordance with the desires of the users of the elevator.

The evaluation function of ride comfort in the elevator is defined as $\psi_e = (a.|V|-b.|G|-c|J|)$. In this case, a, b, and c are weighing integers. The ride comfort can be optimized if the controller 204 controls the current to the motor 203 so that the comfort evaluation function is maximized. The differential of acceleration can be detected directly and accurately, so comfort is affected less by noise than in the case in which a differential circuit is used for the acceleration to be detected.

The evaluation function is not restricted to that of Equation 29 and may be an optional function which matches the desires of the users of the elevators. The controller 184 controls the motor 183. However, when the controller 184 has a function for calculating the occupant riding comfort evaluation function from the information relating to the acceleration and differential of acceleration at each observation point of the elevator body 201 and for outputting calculation results, it can be used as an evaluation testing machine for evaluating the elevator riding comfort. When it is difficult to detect the information relating to the differential of acceleration due to environmental problems, a method in which the motor rotation information (the rotational speed, rotational acceleration, and rotational additional acceleration of the motor) are used to modify Equation 29 may be used.

The controlling methods mentioned above are all for automobiles and elevators, but they can also be used to control high-speed positioning etc. of robot arms etc. and as a slope angle speed-meter when gravity is used as the reference.

Effects of the invention will now be discussed. First, because the present invention permits an automobile or other movable vehicle to be equipped with acceleration differential sensors and controlled by a controller according to the information from the sensors, it can detect the differential of acceleration that the driver usually can sense and instantaneous changes occurring in the automobile. It can detect changes of automobile movement within a suitable range, so as to control the automobile to maintain the maximum value of the tire friction force. Control of the automobile can be appropriately corrected quickly in response to any change caused by a disturbance not expected nor intended by the driver, thus preventing excessive changes of automobile movement.

The present invention permits an automobile or other vehicle to be equipped with acceleration differential sensors to detect at least the traverse differential of acceleration. A controller may then control the steering angle of the rear wheels according to the information from the sensors. Thus, the moment when the automobile begins skidding or slipping can be detected and the rear wheels can be turned slightly in the steering direction of the front wheels, thus preventing excessive changes of automobile movement.

The present invention permits an automobile or other vehicle to have a controller which controls the output torque of the engine or motor according to information from acceleration differential sensors, so the moment when the wheels begin idling or the moment when the maximum friction force is exceeded can be detected. In addition, because the engine or motor torque can be reduced before the driving wheels begin slipping, slippage of the driving wheels can be reduced when starting or accelerating without braking the driving wheels, thus preventing excessive changes of automobile movement.

The present invention permits an automobile, or other vehicle to be equipped with acceleration differential sensors, to detect at least the forward/backward differential of acceleration. A controller may then control the oil pressure of the brake oil pressure controller according to the information from the sensors. Thus, when the wheels of the automobile lock, the brake oil pressure can be reduced. Also, since the moment when the maximum friction force is exceeded can be detected, the brake oil pressure can be reduced before the wheels lock, reducing the frequency of locking of the wheels when braking, thus preventing excessive changes of automobile movement.

In addition, because such an automobile or other vehicle may be controlled by the controller according to acceleration and differential of acceleration information from the acceleration differential sensors, more sophisticated automobile control is possible.

In addition, because the present invention permits an automobile or other vehicle to be equipped with an acceleration differential sensor near the engine which detects both acceleration and differential of accelerations, engine misfiring can be detected on the basis of acceleration information from the sensor. A controller may then control the ignition of the engine. Hence, engine misfiring can be detected immediately and the ignition of the engine controlled, reducing vibration of the engine.

The present invention also permits an automobile to be equipped with acceleration differential sensors to detect both acceleration and differential of accelerations. Hence, an evaluation function of ride comfort can be determined on the basis of information relating to the acceleration and differential of acceleration from the sensors. A controller may then control the suspension mechanism so that the comfort evaluation function may be minimized. The evaluation function of comfort may be defined as $\psi=\Sigma(f_i \cdot |G_i| + g_i \cdot |J_i|)$, when $G_i$ is the acceleration, $J_1$ is the differential of acceleration, and $f_i$ and $g_i$ are weighing integers to optimize comfort for observation point "i". Of course, there may be only one observation point.

The present invention also permits an elevator to be equipped with a cabin, a wire rope used to suspend the cabin, a motor used to wind the rope up/down, a controller used to control the motor, and an acceleration differential sensor attached to the cabin. The sensor is used to detect both the acceleration and differential of acceleration of the cabin. A comfort evaluation function for the elevator may then be determined on the basis of the information from the sensor. The motor can then be controlled by the controller according to the evaluation function. The evaluation function of the comfort is defined as $\psi=\Sigma(a_i \cdot |V_i| - b_i \cdot |G_i| - c_i \cdot |J|)$, when $G_i$ is the acceleration, $J_i$ is the differential of acceleration, the cabin speed is $V_i$, and $a_i$, $b_i$ and $c_i$ are weighing integers for observation point "i". Of course, there may be only one observation point. Thus, the ride comfort to the elevator can be optimized.

An acceleration differential sensor of this invention makes use of the feedback current flowing in a coil, which is proportional to the differential of acceleration experienced by a movable member. The voltage across the coil is proportional to the differentiated value of the feedback current in accordance with the rules of electromagnetic inductance. Thus, the differentiated value of the feedback current, that is, the physical amount proportional to the differentiated value (differential of acceleration) of the acceleration to be applied to the movable member, can be detected accurately by detecting this voltage. In addition, acceleration can also be measured accurately at the same time by measuring the current value. In other words, the differential of acceleration itself can be detected directly with high precision. As a result, detection is less influenced by noise than when using a differential circuit after detecting the acceleration. Detection does not depend on the characteristics of the materials and the structure of the sensor (which would otherwise include strong non-linear elements), so high-precision detection is possible.

FIG. 22 shows the construction of a rotational acceleration differential sensor embodying the present invention. The rotational acceleration differential sensor comprises a rotation pendulum 10, a coil 102 fixed to the rotation pendulum 191, movable electrodes 194, a casing 190, a magnet 193 fixed to the casing 190, fixed electrodes 195, a pendulum displacement detector 196 for detecting displacement of the pendulum 191 from a balanced position, a servo amplifier 197 and a reading resistor 198. Rotational acceleration differential information is derived from the terminal voltage of the coil 192 as shown in FIG. 22.

The pendulum 191 can rotate about an axis perpendicular to the plane of the paper in FIG. 22. This direction will be referred to as "the sensor sensing direction". The movable electrodes 194 are arranged on both sides of a thin lever 194' projecting from the pendulum 191. The fixed electrodes 195 form with electrode 194 two pairs of electrodes each of which form a flat plate capacitor. Displacement of the pendulum 191 is detected by detecting the difference ΔC in electrostatic capacitance between the pair of capacitors, causing the pendulum displacement detector 196 to produce an output proportional to the displacement.

The pendulum 191 also carries the coil 192. When current flows in the coil 192, magnetic flux is generated and the pendulum 193 is subject to a torque due to the magnetic field which is caused by the magnet 193 fixed to the casing 190. Therefore, the current flowing in the coil 192 is feed-back controlled by the servo amplifier 197 so that electrostatic capacitance difference detected by the pendulum displacement detector 196 will be zero (ΔC=0). Thus, the sizes of the upper and lower air gaps in the capacitors will be equal so that the position of the pendulum 191 can be kept at a balanced position irrespective of its inertia.

Now consider the case when the rotational acceleration sensor according to this embodiment is fixed to an object which is rotating. As shown in FIG. 22, when a rotational torque β(t) is applied to the whole sensor in the leftwards direction (sensor sensing direction) at a time t, then a moment of inertia W(t)=J.β(t) is applied to the pendulum 191 of inertial mass J in the rightwards direction. The kinetic equation of the pendulum 191 is then given as follows $$J \cdot \frac{d^2 \theta(t)}{dt^2} = W(t) - w(t) \qquad \text{(Equation 30)}$$

wherein:

J is inertia mass of the pendulum 1;

θ(t) is the rotational displacement of the pendulum 1 from the balanced position at time t;

W(t) is the inertia moment acting on the pendulum 101, and w(t) the control force by position feedback The control force w(t) is proportional to the current flowing in the coil 192, so that the following equations are established;

$$W(t) = \phi I(t) \qquad \text{(Equation 31)}$$

$$\phi = 2\pi r B N \qquad \text{(Equation 32)}$$

wherein:

φ is the flux crossing coefficient;

r is the radius of the coil 102;

B is the flux density of the magnet 3; and

N is the number of windings of the coil 102.

If the control force follows the inertia moment W(t) so that the pendulum 191 is always in the balanced position, the left side of the Equation 30 becomes zero, and the following equation holds:

$$W(t) = J\beta(t) = w(t) = \phi I(t) \qquad \text{(Equation 33)}$$

Therefore, the rotational acceleration acting on the whole of the sensor is as follows:

$$\beta(t) = \phi/J \, I(t) \qquad \text{(Equation 34)}$$

and the rotational acceleration can be detected from the current flowing in the coil.

On the other hand, the rotational acceleration differential acting on the whole of the sensor γ(t) is given as follows:

$$\gamma(t) = \frac{d\beta(t)}{dt} = \frac{\phi}{J} \frac{dI(t)}{dt} \qquad \text{(Equation 35)}$$

Hence, the circuit equation for current flowing in the coil 103 is as follows:

$$e = L \cdot \frac{dI(t)}{dt} \qquad \text{(Equation 36)}$$

wherein L is the inductance of the coil. Therefore, the rotational acceleration differential γ(t) is as follows:

$$\gamma(t) = \frac{\phi}{J} \cdot \frac{e}{L} \qquad \text{(Equation 37)}$$

Hence, the rotational angular acceleration can be measured by detecting the terminal voltage between the ends of the coil 192.

This embodiment describes an arrangement in which the rotary pendulum supports the coil and the casing supports the magnet. However, even when the rotary pendulum supports the magnet and the casing supports a coil, or an arrangement in which the magnet is a permanent magnet or electromagnet, the differential of angular acceleration can be detected.

Thus, in a similar way to the derivation of information relating to the differential of acceleration, information relating to the differential of angular acceleration may be obtained by converting analog signals to digital signals by adding a second order analog differential means (filter) to a general angular velocity sensor or via an A-D converter and by performing digital processing, or by converting analog signals to digital signals by adding a first order analog differential means (filter) to an angular acceleration speed sensor or via an A-D converter and by performing digital processing.

Therefore, any one of such arrangements may be selected in dependence on the hardware structure, controller processing speed, and necessary detection accuracy. By using information relating to the differential of angular acceleration in addition to various types of control using information relating to the differential of acceleration which are shown in the other embodiments of the present invention, movement control and a movement controller with higher accuracy can be achieved and an evaluation testing machine with high performance can be achieved.

Figure 23:
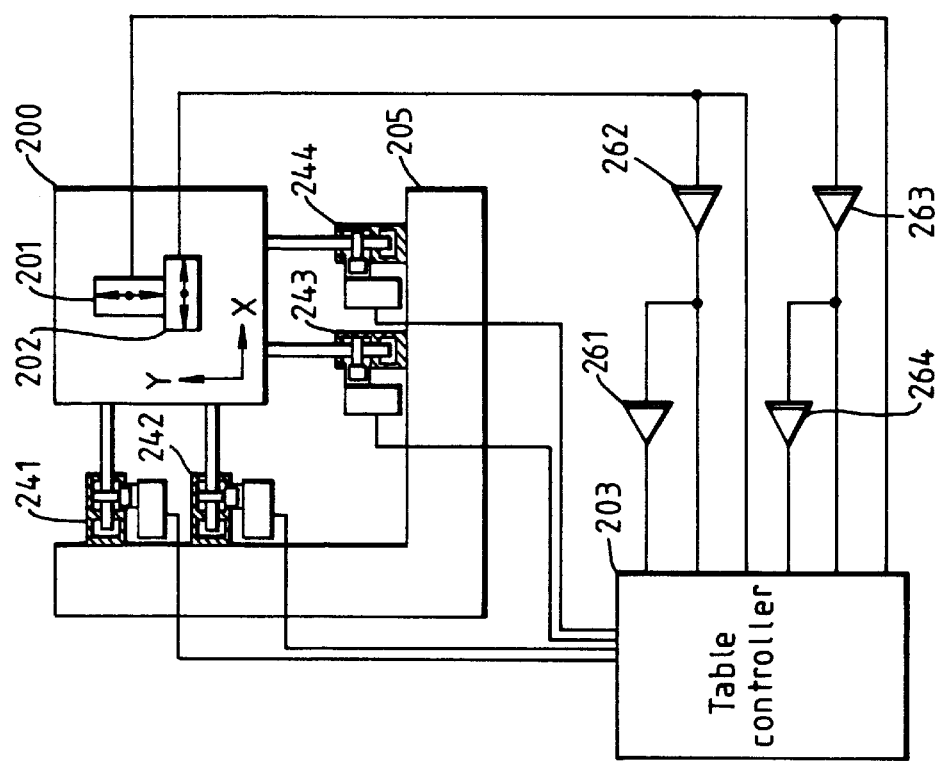
FIG. 23 shows an earthquake simulator incorporating the present invention.

FIG. 23 shows the construction of an earthquake simulator employing information relating to the differential of acceleration. The earthquake simulator controls the movement of an oscillating table 200 so that earthquake acceleration, earthquake acceleration differential or displacement input, (which is pre-input to a controller) will be reproduced correctly. The oscillating table 200 is controlled for movement in the x direction by oil pressure actuators 241, 242 driven by a table controller 203 and for movement in the y direction by actuators 243, 244. The oil pressure actuators are each provided with a displacement sensor therein, and displacement information is input to the table controller 203. The differential of acceleration in the x direction and y direction of the oscillator table 200 are detected by the acceleration differential detectors 201, 202 on the oscillating table 200. The resulting information is converted into acceleration and velocity in the x and y directions by integrators 261, 262, 263 and 264 and input to the table controller 203. Displacement information can be obtained by supplying velocity information to the integrator in series. These four kinds of signals are fed back to the table controller 203. The table controller 203 compares those signals with earthquake acceleration, earthquake acceleration differential displacement input in advance, and the oscillating table 200 is driven (vibrated) to a target value.

Using this construction, a component of the differential of the acceleration can be used as control information, in addition to the information used in a conventional simulator, so that the earthquake simulator has a good response and stable behaviour.

This embodiment illustrates a two-dimensional earthquake simulator; however, similar effects can be achieved with a three-dimensional earthquake simulator control using information corresponding to the differential of acceleration in addition to the information conventionally used.

Figure 24:
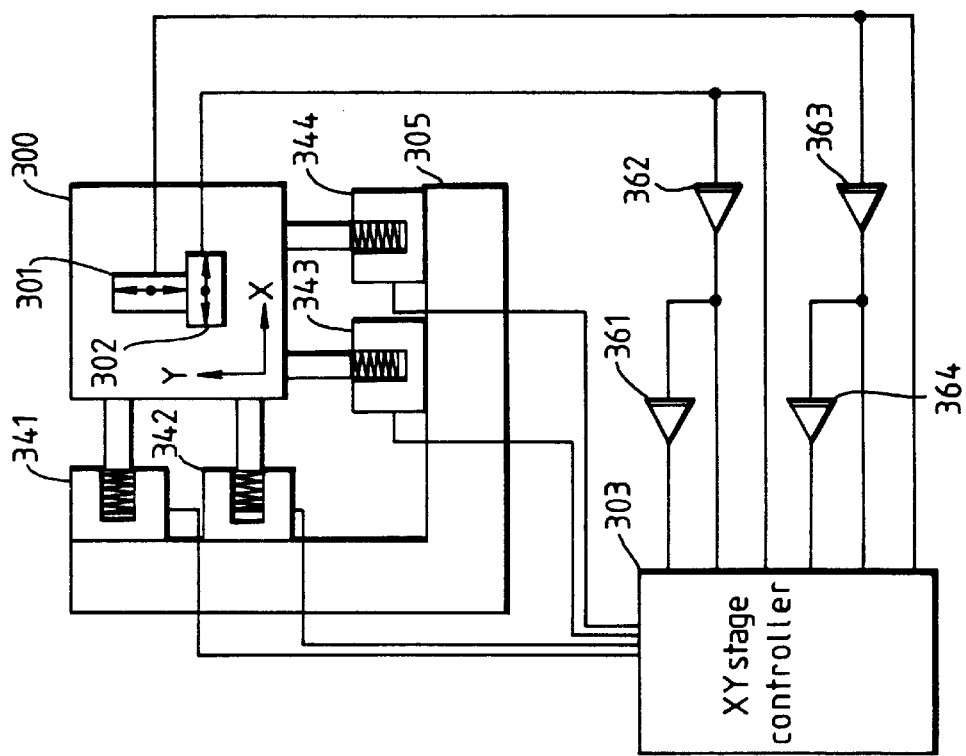
FIG. 24 shows an XY stage incorporating the present invention.

FIG. 24 illustrates the construction of an XY stage apparatus using information corresponding to the differential of acceleration. The XY stage apparatus controls movement of an XY state 300 so that it follows correctly a position pre-input to a controller 303.

Movement of the XY stage 300 in the X direction is controlled by linear actuators 341, 342, driven by a stage controller 303 and movement of the XY stage 300 in the y direction is controlled by linear actuators 343, 344. The linear actuators include displacement sensors and displacement information is input to the stage controller 3. The differentials of acceleration in the x and y directions are detected by sensors 301, 302 on the X Y stage 300 which detect the differential acceleration. The resulting information is converted into information corresponding to acceleration and velocity in the x and y axis direction by integrators 361 to 364 and input to the stage controller 303 position information for the XY stage 300 can be obtained by supplying velocity information to the integrators. Alternatively, the integration operation can be carried out within the stage controller 307.

Information as to the position, velocity, acceleration and differential of acceleration is fed back to the stage controller 303, compared with a position pre-input to the stage controller 303 in advance, and the XY stage 300 is moved to a target position. Thus, information relating to the differential acceleration is used, in addition to the information used in a conventional XY stage apparatus, so that the XY stage apparatus has a good response and stable behaviour. Also, although in this embodiment, illustrates a two-dimensional XY stage, similar effects can be achieved with a one-dimensional or three-dimensional XY stage apparatus.

The stage controller 303 controls each actuator 343, 344. However, when the controller 303 has a function for calculating the control performance evaluation function from the information relating to the acceleration and differential of acceleration at each observation point of the stage and for outputting calculation results, it can be used as an evaluation testing machine for evaluating the control performance of the XY stage.

Figure 25:
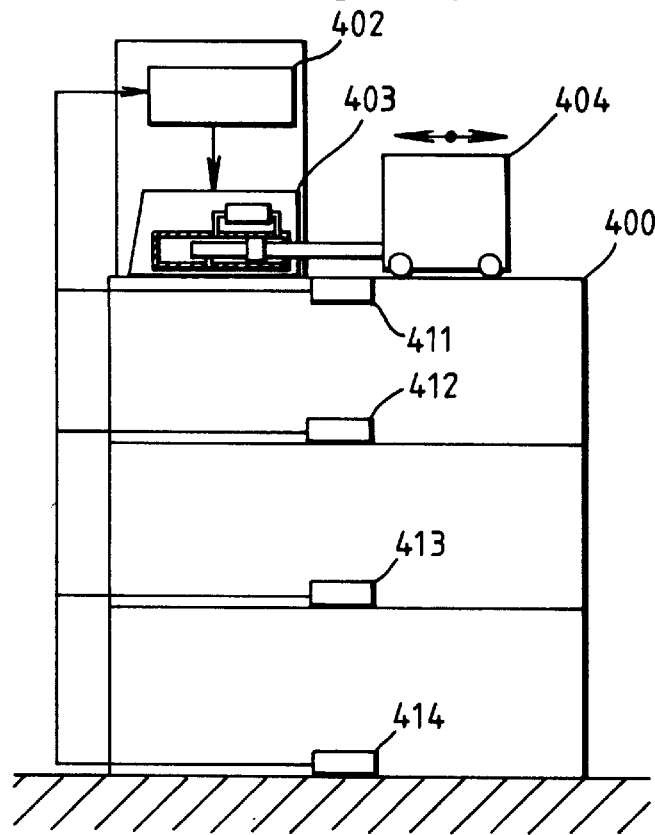
FIG. 25 is a schematic diagram of a damped building incorporating the present invention.

FIG. 25 shows the construction of a building 400 with a damper which is controlled using information relating to a value of differential acceleration. As shown in FIG. 25, an oil pressure actuator 403 and an active mass 404 are provided on a suitable floor of the building 400. The oil pressure actuator 403 is fixed to the building and the active mass 404 is movable relative to the oil pressure actuator. A controller 402 has a signal processor incorporated therein which can calculate acceleration velocity and displacement information on the basis of information from acceleration differential sensors 411, 412, 413, 414 on each floor. The controller 402 controls the oil pressure in the actuators 403 on the basis of such information so that vibration of the whole building can be minimised.

By using information corresponding to the differential of acceleration, small changes in acceleration can be detected.

The controller 402 controls the actuator 403. However, when the controller 402 has a function for calculating the control performance evaluation function from the information relating to the acceleration and differential of acceleration at each observation point of a building and for outputting calculation results, it can be used as an evaluation testing machine for evaluating the control performance for a building with vibration-proof equipment.

FIG. 26 shows the construction of a railway vehicle using information relating to the differential of acceleration.

As shown in FIG. 26, a railway vehicle body 501 is mounted on front and rear pairs of bogies, 551, 552 each of which can turn freely around the center of bolster spring actuators 541, 542. The bogies 551,552 are supported by wheels 521, 522, 523 524 through axle spring actuators 543, 544, 545, 546, 547, 548, 549, 550. Acceleration differential sensors 531, 532, 533 are provided on the vehicle body 501 and can detect information relating to the differential of acceleration of the vehicle body 501 in the vertical direction. A controller 506 has a signal processor with integration circuits incorporated therein, and can calculate acceleration, velocity and displacement information on the basis of information from acceleration differential sensors 531, 532, 533. The controller 506 controls the bolster spring actuators 541, 542 and the axle spring actuators 543, 544, 545 on the basis of the information so that riding comfort is not reduced during travelling even if the railway track has a slight irregularity.

By using information relating to the differential of acceleration, changes in acceleration can be detected. At the same time, changes in height and/or attitude of the vehicle body 501 can be controlled positively so that derailment of the vehicle is unlikely.

Figure 27:
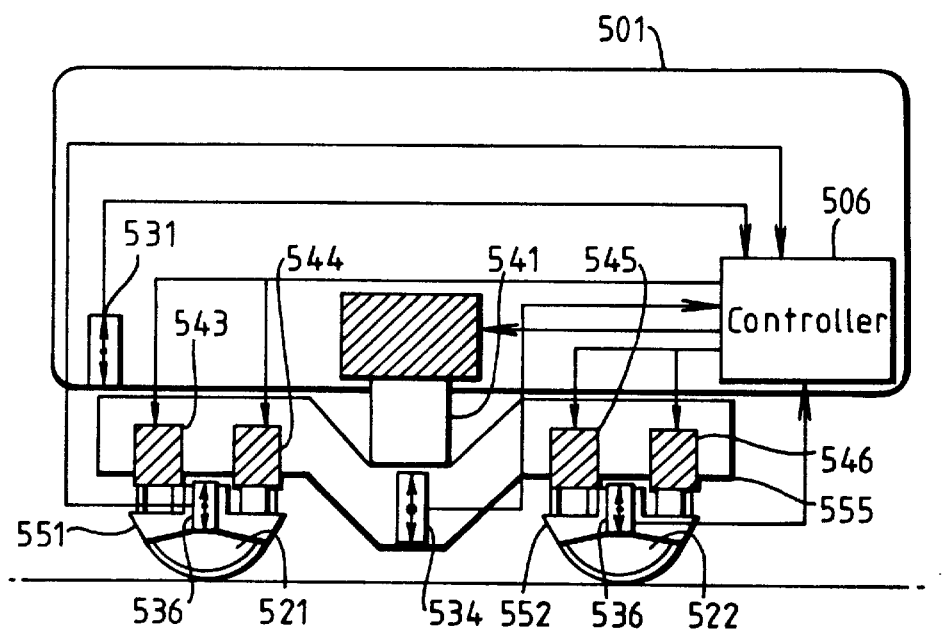
FIG. 27 shows a modification of the railway vehicle of FIG. 26, again incorporating the present invention.

FIG. 27 shows an embodiment which is a modification of that of FIG. 26. Corresponding parts are indicated by the same reference numerals. In FIG. 27 the differential of acceleration of the vehicle body 501, bogie 555 and bearings 551, 552 is detected. Usually, the vehicle body 501, bogie 555, bearings 521, 522 each have a different resonance point. By detecting a resonance vibration using the acceleration differential and feeding signals back to the controller 506, control giving a more comfortable ride can be achieved.

Figure 28A:
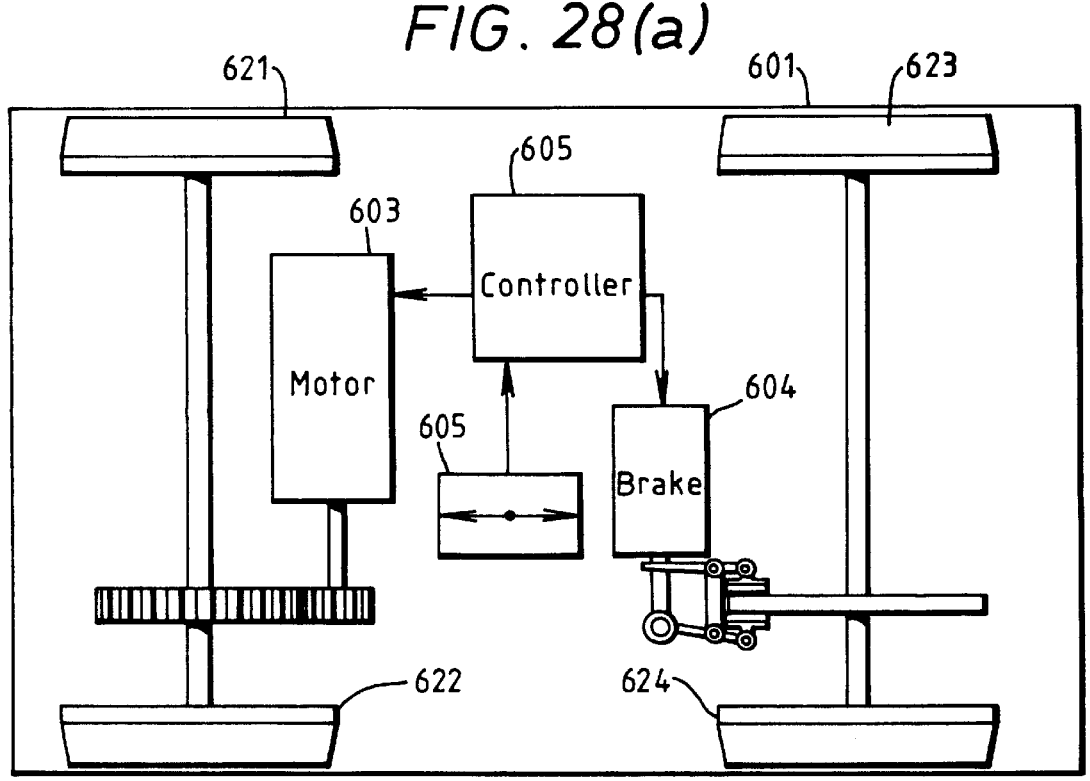
FIGS. 28(a) and 28(b) show a further modification of the railway vehicle of FIG. 26.
Figure 28B:
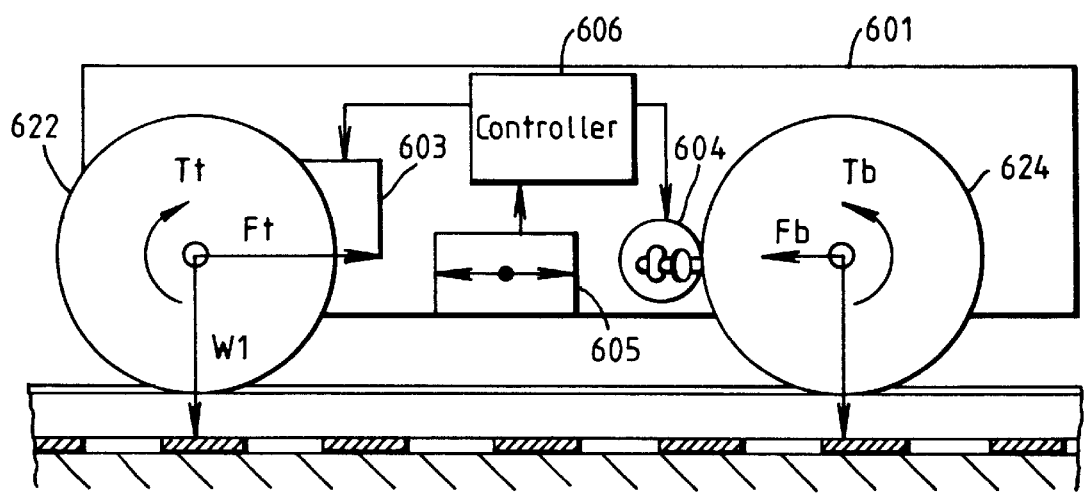

FIGS. 28(*a*) and 28(*b*) show the construction of a power control system of a railway vehicle using information relating to the differential of acceleration. As shown in FIGS. 28(*a*) and 28(*b*) drive wheels 621, 622 are driven by a motor 602 controlled by a controller 606. Brake wheels 623, 624 are braked by a brake 604 controlled by the controller 606.

The vehicle body 601 has an acceleration differential sensor which detects the differential of acceleration in the direction of travel. The controller 606 has a signal processor incorporated therein which has an integration circuit so that the controller 606 can calculate acceleration, velocity, and displacement information from information from the acceleration differential sensor 605 on the vehicle body 601. FIGS. 28(*a*) and 28(*b*) illustrate the time at which the wheels are about to turn on the rail. If the adhesion coefficient between a wheel and the rail, and the weight of the axle are $\mu$ and W, respectively, the maximum traction force which can be generated by frictional force F between the wheel and the rail can be expressed as follows:

$$F = \mu W \quad \text{(Equation 38)}$$

If the rotational force is increased above this value, the wheel spins on the rail.

As the rotational force of the wheel increases gradually from zero, acceleration of the vehicle body increases. However, as mentioned above, once spinning of the wheels starts, the acceleration decreases significantly. This can be detected using information relating to the differential of acceleration in the direction of travel. In a railway vehicle, as in an automobile, adhesion of the wheels can be improved by detecting the differential of acceleration in the direction of travel and controlling the motor accordingly.

Braking also can be improved in the same way. If the braking torque increases above the maximum traction force F, slipping of the brake wheel 623, 624 takes place. As the brake torque increases gradually from zero, deceleration of the vehicle body 601 also increases. However, once the brake wheel 623, 624 starts to slip (wheel lock), the deceleration decreases significantly. Again this can be detected using information relating to the differential of acceleration. Thus, for a railway vehicle, as for an automobile, adhesion of the wheels can be improved by detecting the differential of acceleration in the direction of travel and controlling the brake accordingly.

In this embodiment, the invention is applied to the case where the drive wheels 621, 622 and the brake wheels 623, 624 are separate. However, the invention can also be applied to a vehicle in which the same wheel is used for driving and braking.

Figure 29:
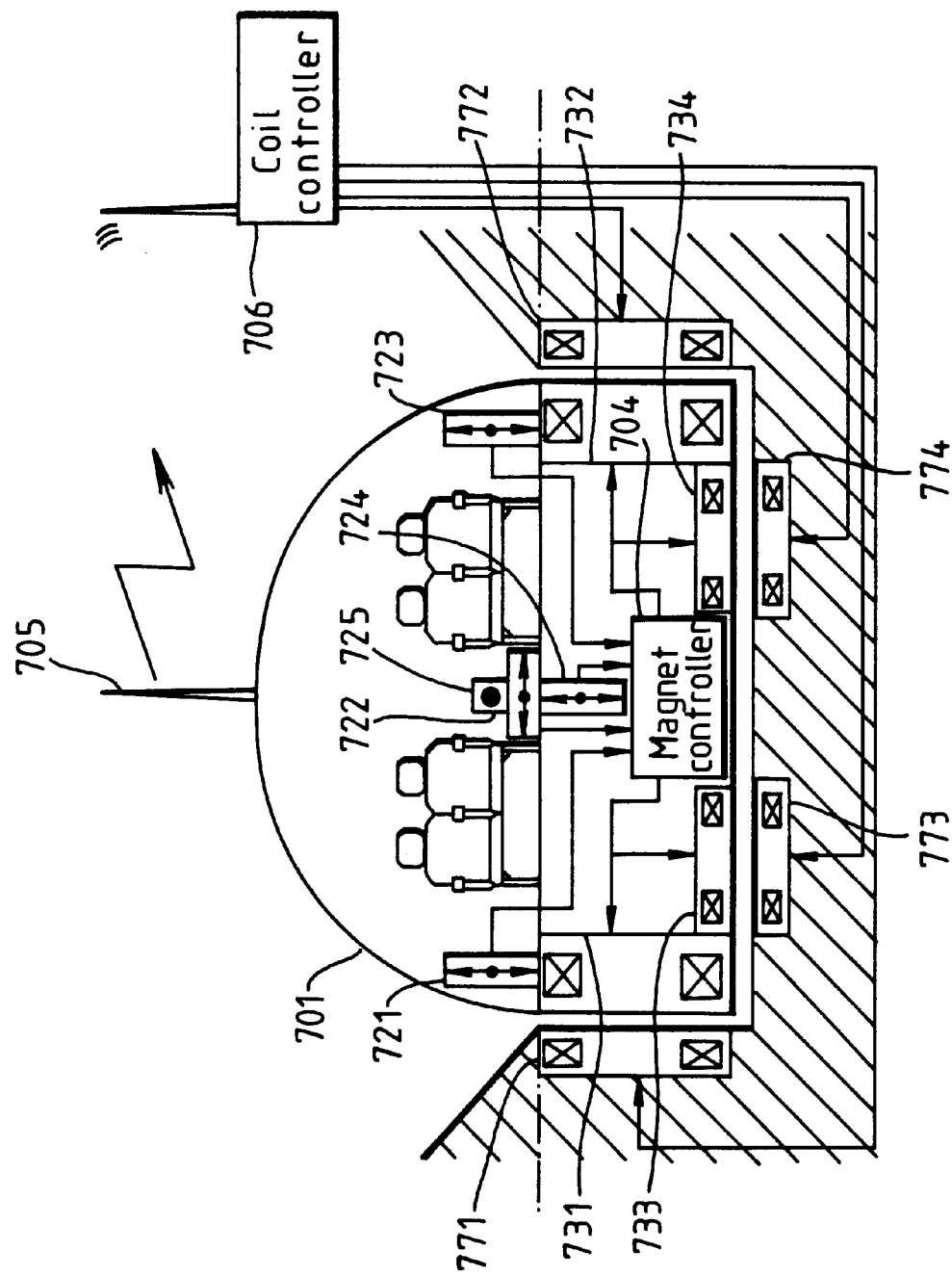
FIG. 29 shows a magnetic levitation vehicle incorporating the present invention.

FIG. 29 shows a sectional view of the construction of a magnetic levitation railway vehicle employing information relating to the differential of acceleration. As shown in FIG. 29, the body 701 of the railway vehicle floats due to magnetic repulsion between levitation coils 773, 774 on the ground and superconductive magnets 733, 734 on the vehicle body 1. When current flows in propulsion coils 771, 772 there is an attractive force between those propulsion coils 771, 772 and superconductive magnets 731, 732 on the vehicle body 701. This attractive force propels the railway vehicle.

Sensors 721, 722, 723, 724 are provided on the vehicle body 701, which detects the differential of acceleration in the forward, backward, upward, downward and lateral directions.

A magnet controller 704 has a signal processor incorporated therein, the signal processor being formed by integrating circuits. The magnet controller 704 calculates information corresponding to the acceleration, velocity and displacement of the vehicle body 701 on the basis of information from the sensors 721, 722, 723, 724. The magnet controller 704 controls the magnetic force generated by the superconductive magnets 731, 732, 733, 734 and also passes information to a coil controller 706 on the ground via an antenna 705. The coil controller 706 controls the current flowing in the propulsion coils 771, 772 and the levitation coils 773, 774. This then controls levitation attitude, position, velocity and acceleration of the vehicle body 701.

By using information corresponding to the differential of acceleration, small changes in the acceleration can be detected so that vibration of the magnetic levitation railway vehicle can be reduced. Also, changes in height of the vehicle body 701 and attitude changes can be controlled, so that satisfactory movement of the railway vehicle can be achieved.

Figure 30:
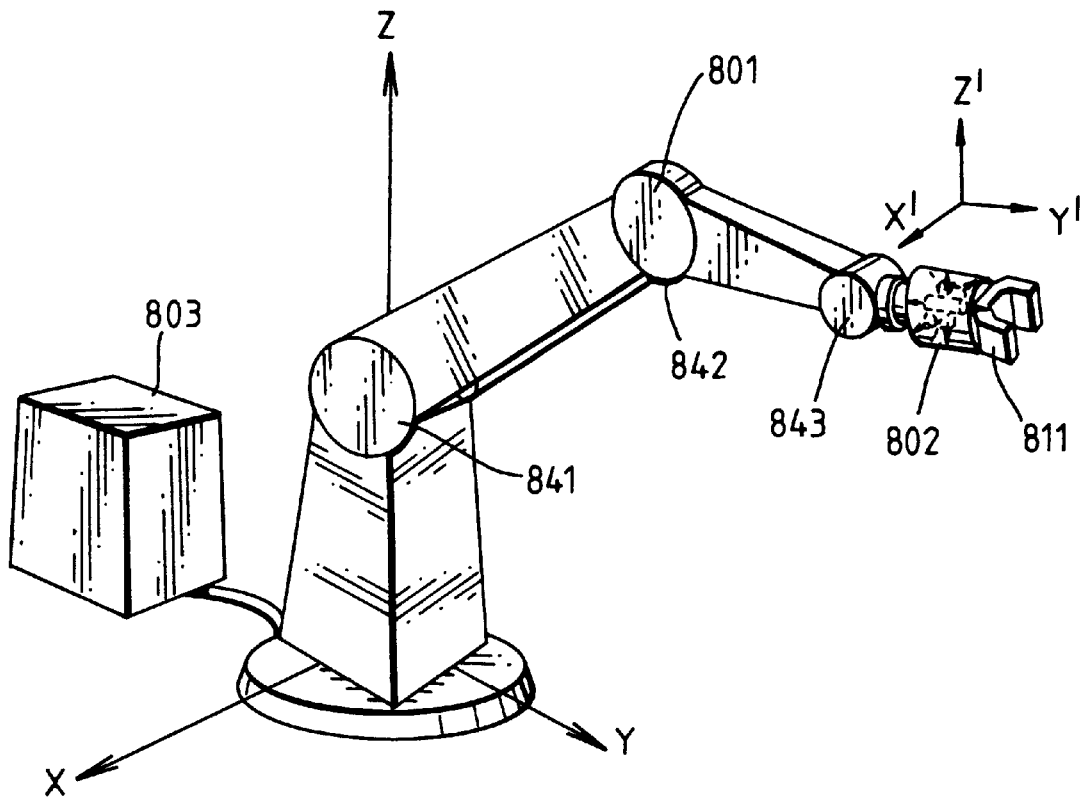
FIG. 30(a) and 30(b) shows a manipulator incorporating the present invention.
Figure 30:
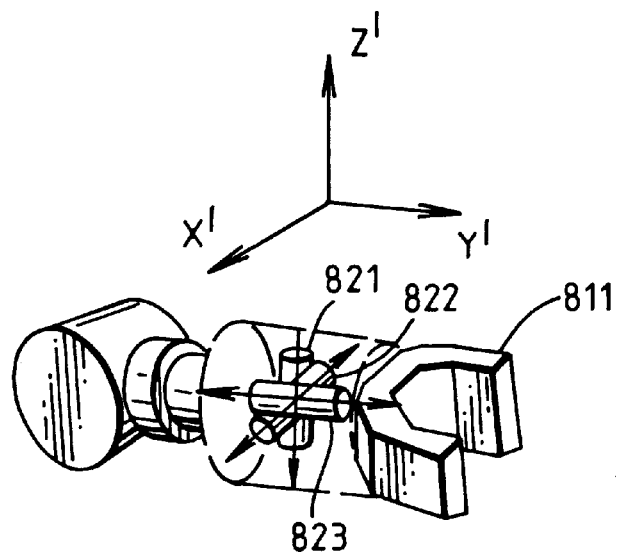

FIGS. 30(a) and 30(b) show the construction of a manipulator using information corresponding to the differential of acceleration. As shown in FIG. 30(a) movement of a manipulator 801 is controlled so that it follows position information pre-input to a controller 803. The movement of the manipulator 801 is controlled by motors 841, 842, 843 for driving the joints of the manipulator, the motors 841, 842, 843 being controlled by the controller 803. Each motor has an encoder and rotation angular information is input to the controller. The differential of acceleration in the X, Y and Z directions of a coordinate system defined by the orientation of the jaw 811 of the manipulator 801 (see FIG. 30(b)) are detected by the sensors 821, 822, 823 arranged on the jaw 811. The controller 803 calculates acceleration, velocity and displacement information on the basis of information from the sensors 821, 822, 823.

That information is compared with position, velocity and acceleration information pre-input to the controller 803 and the manipulator 801 can thus be moved to a target position. Thus, information corresponding to the differential of acceleration is used in addition to the information used in a conventional manipulator, so that a better performance can be achieved.

In FIG. 31(b) three acceleration differential sensors 821, 822 and 823 are mounted on the manipulator 801. However, in the same way as the additional acceleration information detection method with 6 degrees of freedom in an automobile 100 shown in FIG. 13, by detecting the movement of the manipulator 801 with 6 degrees of freedom, more accurate control may be achieved.

The controller 803 controls each motor. However, when the controller 803 has a function for calculating the control performance evaluation function from the information relating to the acceleration and differential of acceleration at each observation point of the manipulator 801 and for outputting calculation results, it can be used as an evaluation testing machine for evaluating the control performance of the manipulator 801.

FIGS. 31(a) and 31(b) show the construction of an airplane using information corresponding to the differential of acceleration. In FIGS. 31(a) and 31(b) the body 901 of the airplane has sensors 921, 922, 923 which sense the differential of acceleration in the upward, downward and lateral directions. Also, the main wings 942 of the airplane have acceleration differential sensors 924, 925 for sensing twist and bending moments of the main wing 942. A controller 903 calculates acceleration velocity and displacement information on the basis of information from the sensors 921, 922, 923, 924 and 925 on the body 901. By using information corresponding to the differential of acceleration, small changes in the forces applied to the body 901 can be sensed as small changes in acceleration.

The controller 903 controls a flap in a horizontal control surface 941, a flap in the main wing 942, a vertical control surface 943, a horizontal stabilizer 944, a vertical stabilizer 945 and the output of the engine (not shown). In this way, a control configured vehicle (CCV) can be designed in which the six axes of freedom of the body 901 can be controlled independently. The attitude and direction of flight can be controlled separately. For example, direct force control, airplane direction control and airplane translation control can be effected.

Since the main wing also has sensors 924, 925 for sensing any twist or bending movement of the main wing 942, fluttering of the airplane can be prevented by artificially decreasing the critical flutter mode by strengthening damping of flutter by driving air controls on the basis of the information corresponding to twist or bending movement of the main wing 942.

Figure 32:
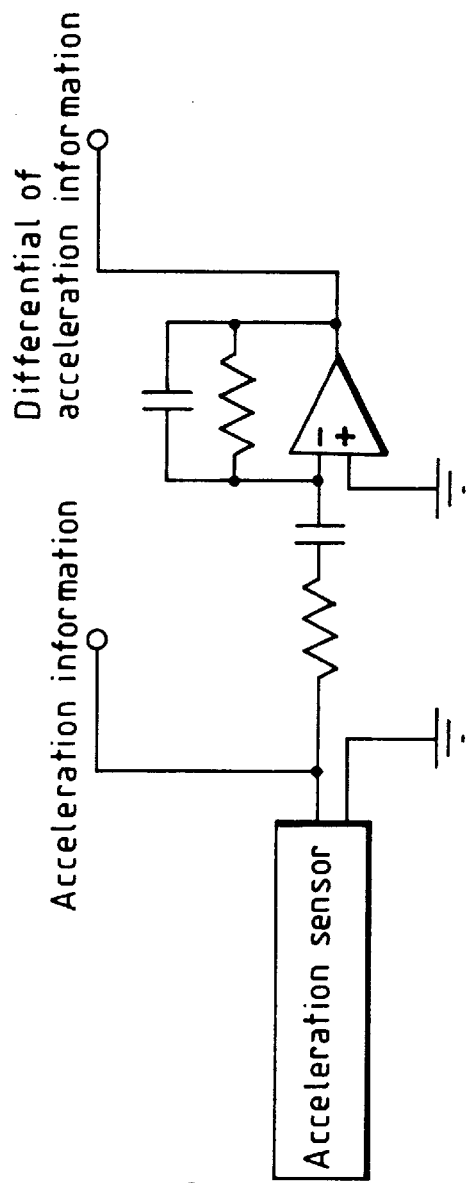
FIG. 32 is a diagram of a circuit for deriving the differential of acceleration using an acceleration sensor.
Figure 33:
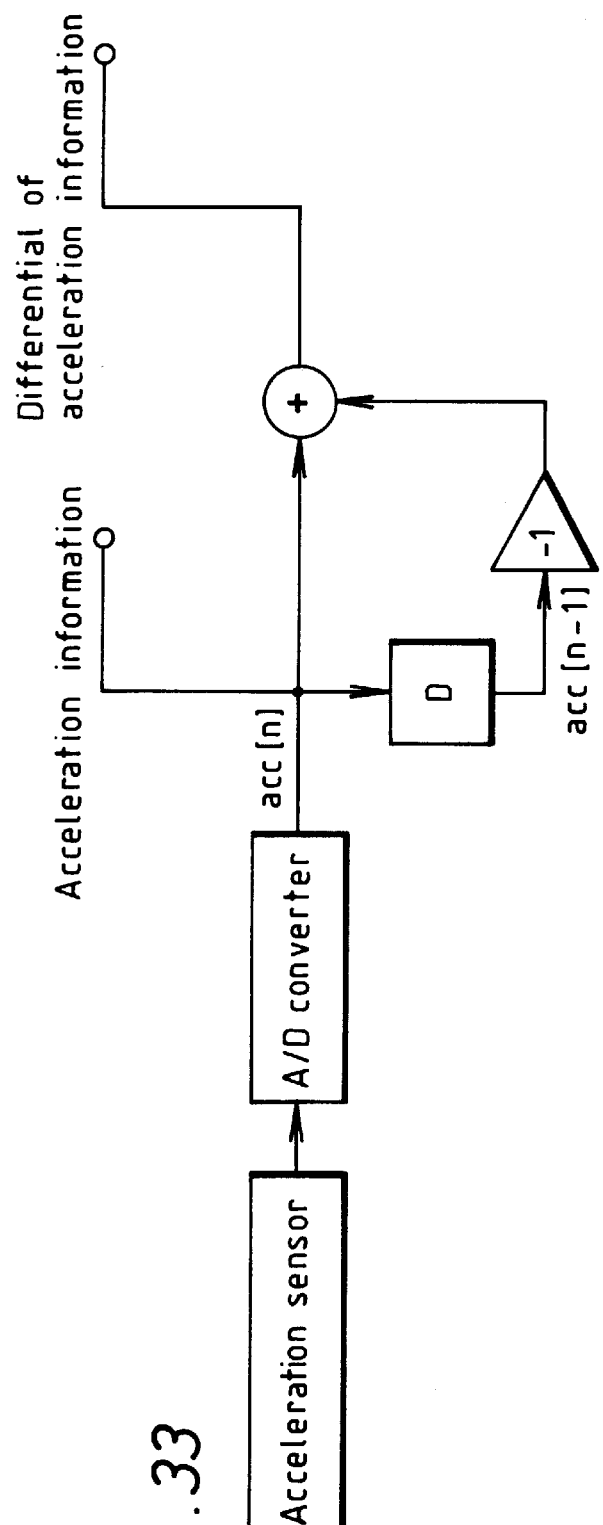
FIG. 33 is a diagram of another circuit for deriving the differential of acceleration using an acceleration sensor.

FIG. 32 shows a differential of acceleration detection method using an acceleration sensor and analog differential circuit which is a modification of the example of the acceleration differential sensor 51 shown in FIG. 1. FIG. 33 shows a differential of acceleration detection method using an acceleration sensor and a digital differential circuit which is a further modification of the acceleration differential sensor 51 shown in FIG. 1. Information relating to the differential acceleration may be obtained by converting analog signals to digital signals by adding an analog differential means (filter) to a general acceleration speed sensor, as shown in FIGS. 32 and 33 or via an A-D converter, and by performing digital processing. In FIG. 33, the signal from the acceleration sensor is passed to an analog/digital converter, and then to a delay circuit (D). The resulting signal is multiplied by −1 and fed to an addition circuit which sums it with the direct output of the analog/digital converter.

Figure 34A:
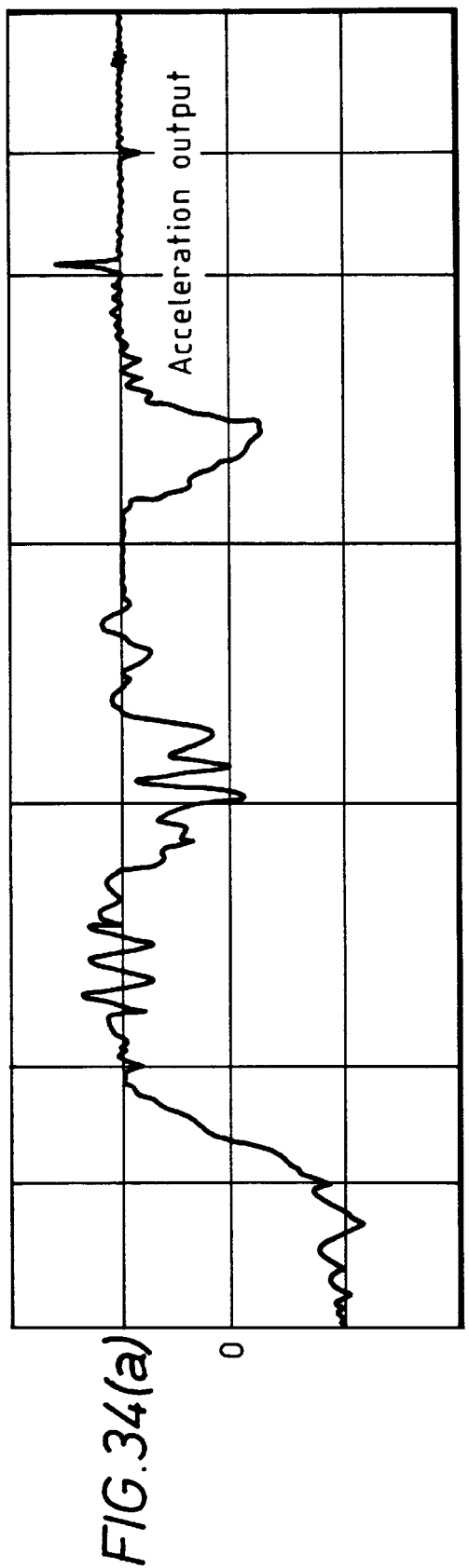
FIGS. 34(a) and 34(b) are graphs illustrating acceleration and differential of acceleration.
Figure 34B:
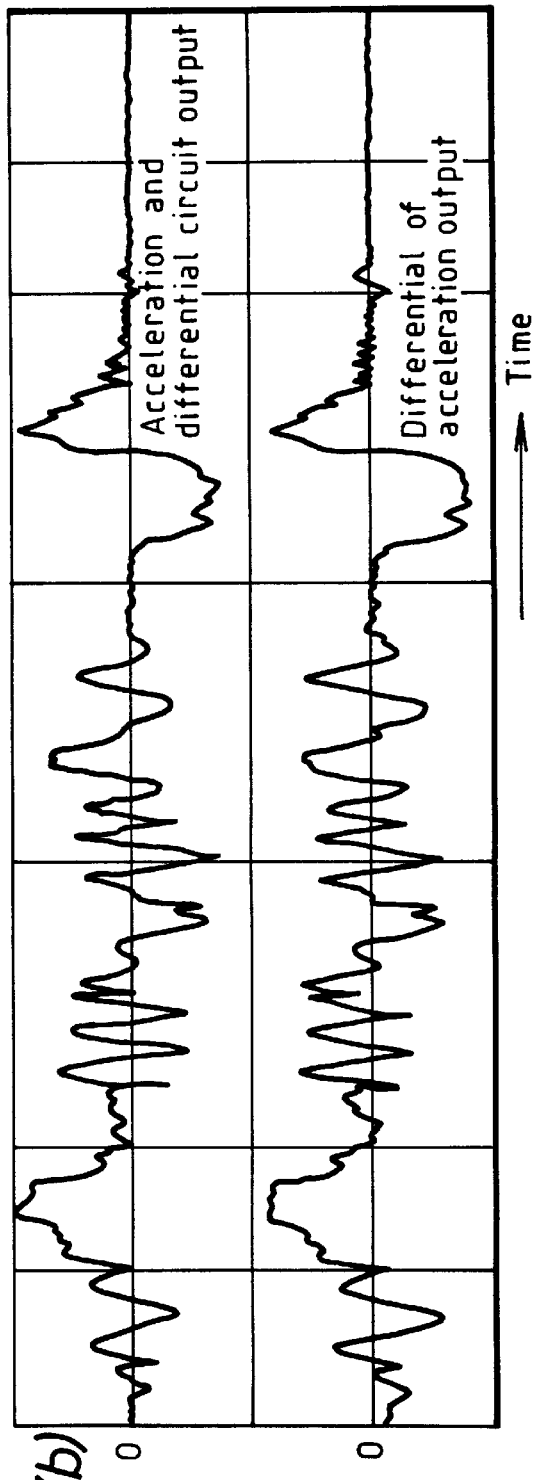

FIGS. 34(*a*) and 34(*b*) show the acceleration and differential of acceleration detected by the sensors in this embodiment and the output of the acceleration analog differential circuit. FIG. 34(*a*) shows the acceleration output detected by the acceleration sensor. The upper part of FIG. 34(*b*) shows the output after the acceleration output shown in FIG. 34(*a*) passes through an analog differential circuit. The lower part of FIG. 34(*b*) shows the differential of acceleration output detected by an acceleration differential sensor. The acceleration analog differential output and the differential of acceleration output detected by the acceleration differential sensor match in FIG. 34(*b*) showing that both the outputs in FIG. 34(*b*) match the output in FIG. 34(*a*).

Figure 35A:
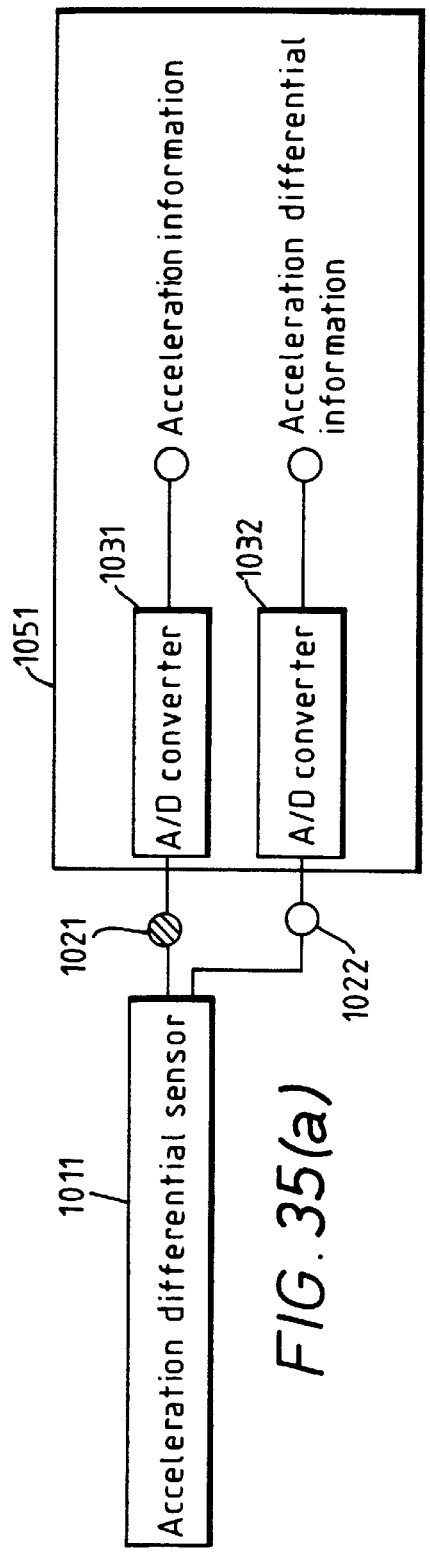
FIGS. 35(a) and 35(b) show alternative arrangements for deriving information relating to the differential of acceleration according to the present invention.
Figure 35B:
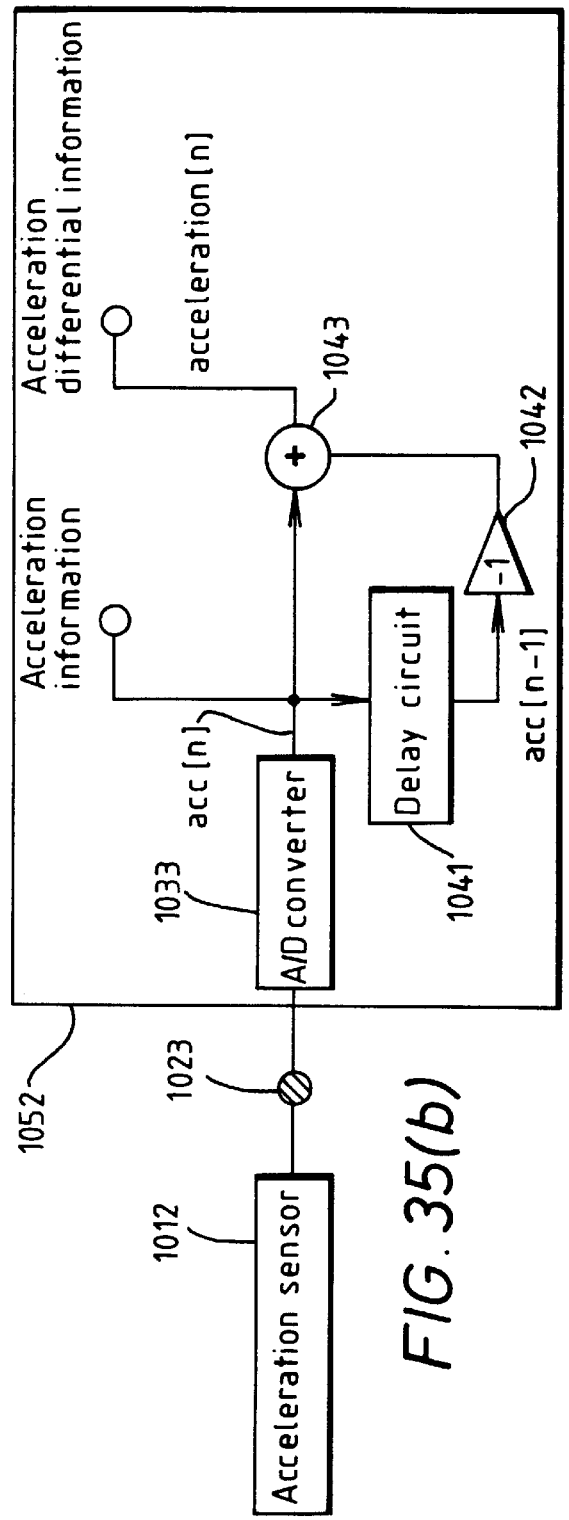

FIGS. 35(*a*) and 35(*b*) show two different ways of obtaining information corresponding to the acceleration and the differential of acceleration.

In FIG. 35(*a*), an acceleration differential sensor 1011 generates two outputs 1021, 1022 corresponding to acceleration and differential acceleration, respectively. A controller 1051 receives those outputs 1021 or 1022 and converts them to digital information using respective analog/digital converters 1031, 1032. With such an arrangement, the controller 1051 needs two input ports, for the signal 1021, 1022, and two analog/digital converters 1021, 1032.

In such an arrangement, the acceleration differential sensor 1011 may be as shown in and as described with reference to FIGS. 4 to 7, with the signal 1021 being that across the coil 3 and the signal 1022 being that across the resistor 6.

In FIG. 35(*b*), an acceleration sensor 1012 is provided which measures the acceleration. Such an acceleration sensor 1012 may be a conventional one. The output 1023 of that sensor 1012 is passed to a controller 1052, which has therein an analog/digital converter 1033 which converts the signal 1023 to digital information. Information corresponding to the acceleration is then derived directly, but that information is also passed via a delay circuit 104 and a multiplier 1042 to an adder 1043, where the delayed acceleration information is compared with the current acceleration information. From this, information corresponding to the differential of acceleration can be derived directly. With the arrangement of FIG. 35(*b*), the controller 1052 needs only one input port, and only one analog/digital converter 1033.

What is claimed is:

1. A controller having a closed central loop for controlling acceleration or force of a movable object, comprising:

a sensor for directly measuring a value representing a differential of acceleration of said movable object; and means for generating a control signal in dependence on said value, including means for feeding back in said closed central loop a value derived by multiplying a measured value of a differential of acceleration by a gain, thereby to control said movable object.

2. A controller according to claim 1, wherein said sensor operates to produce said value directly from said movement of said object.

3. A controller according to claim 1, wherein said sensor operates to measure both an amount of acceleration corresponding to movement of said body and said value of differential of acceleration.

4. A controller according to claim 1, wherein said sensor comprises:

electromagnetic force generating means having a coil and a magnet;

a movable member driven by said electromagnetic force generating means;

displacement detecting means for detecting the displacement of said movable member;

current supply means for supplying current to said coil of said electromagnetic force generating means on the basis of output of said displacement detection means so that said movable member is positioned at a reference position; and voltage detecting means for detecting the voltage of said coil produced by said current to position the movable member at said reference position, wherein said voltage directly corresponds to the differential of acceleration.

5. A controller according to claim 4, wherein said displacement detecting means for detecting displacement of said movable member relative to a first member includes capacitor plates mounted on said first member and said movable member, respectively, and sensing means for sensing the variation of capacitance of said capacitor plates due to displacement of said movable member relative to said first member.

6. A controller according to claim 5, wherein said movable member is a pendulum.

7. A controller according to claim 5, wherein said first member is a casing of said sensor.

8. A controller according to claim 5, wherein said movable member is mounted so as to be rotatable relative to said first member, whereby said voltage corresponds to a value of differential rotational acceleration.

9. A controller having a closed control loop for controlling acceleration or force of a movable object, comprising:

a sensor for directly measuring a first value representing an acceleration of said movable object and a second value representing a differential of acceleration of said movable object; and means for generating a control signal in dependence on said first value and said second value, including means for feeding back in said closed control loop a value derived by multiplying a measured first value of acceleration by a gain and a value derived by multiplying a measured second value of a differential of acceleration by a gain, thereby to control said movable object.

10. A method of controlling acceleration or force of a moving object using a feedback control system including a closed control loop, comprising the steps of:

detecting movement of said moving object;

measuring a value directly representing a differential of acceleration corresponding to said movement by using a sensor for measuring differential of acceleration; and generating a control signal in dependence on said value, through derivation of a feedback value by multiplying the measured value of differential acceleration by a gain, and through feedback of said feedback value in said closed control loop, thereby to control said moving object.

11. The combination of:

a movable object;

means for generating a force in a predetermined direction on said movable object; and a control system having a differential acceleration feedback control loop for generating a control signal for controlling said means for generating said force;

said control system comprising:

a sensor for directly measuring a value representing a differential of acceleration of said movable object; and means for generating said control signal in dependence on said value representing a differential of acceleration, including means for feeding back in said feedback control loop a value derived by multiplying said value of differential of acceleration by a gain.

12. The combination according to claim 11, wherein said movable object is an automobile.

13. The combination according to claim 12 wherein said means for generating a force is a steering apparatus for steering said automobile and said predetermined direction is transverse to said automobile.

14. The combination according to claim 12, wherein said means for generating said force is a braking system for braking movement of said automobile, and said predetermined direction is longitudinal to said automobile.

15. The combination according to claim 12, wherein said means for generating said force is a motor for said automobile, and said predetermined direction is longitudinal to said automobile.

16. The combination according to claim 12, wherein said means for generating said force is a suspension for said automobile, and said predetermined direction is vertical.

17. The combination according to claim 11, wherein said movable object is an engine of an automobile, and said means for generating said force is a suspension for said engine.

18. The combination according to claim 11, wherein said movable object is a elevator cage, and said means for generating said force is a drive system for said elevator cage.

19. The combination according to claim 11, wherein said movable object is an earthquake simulator table and said means for generating said force comprises actuators for said earthquake simulator table.

20. The combination according to claim 11, wherein said movable object is an XY stage and said means for generating said force comprise actuators for said XY stage.

21. The combination according to claim 11, wherein said movable object is a building and said means for generating said force is a movable damper.

22. The combination according to claim 11, wherein said movable object is a railway vehicle, and said means for generating said force comprise actuators of a suspension of said railway vehicle.

23. The combination according to claim 11, wherein said movable object is a magnetic levitation vehicle and said means for generating said force comprising magnets acting on said magnetic levitation vehicle.

24. The combination according to claim 11, wherein said movable object is a manipulator.

25. The combination according to claim 11 wherein said movable object is an airplane.

26. The combination according to claim 11, wherein said sensor comprises:

electromagnetic force generating means having a coil and a magnet;

a movable member driven by said electromagnetic force generating means;

displacement detecting means for detecting the displacement of said movable member;

current supply means for supplying current to said coil of said electromagnetic force generating means on the basis of output of said displacement detection means so that said movable member is positioned at a reference position; and voltage detecting means for detecting the voltage of said coil produced by said current to position the movable member at said reference position, wherein said voltage directly corresponds to the differential of acceleration.

27. The combination according to claim 26, wherein said sensor is fixed to said movable object.

28. A control system for controlling acceleration of a movable body, comprising:

means for directly detecting a differential of acceleration from movement of said movable body;

a closed control loop having a feedback path and means for supplying to said feedback path a value derived by multiplying a value of differential of acceleration from said detecting means by a gain; and means responsive to said closed control loop for controlling the acceleration of said movable body.

29. A control system according to claim 28, wherein said detecting means is a sensor comprising:

electromagnetic force generating means having a coil and a magnet;

a movable member driven by said electromagnetic force generating means;

displacement detecting means for detecting the displacement of said movable member;

current supply means for supplying current to said coil of said electromagnetic force generating means on the basis of output of said displacement detection means so that said movable member is positioned at a reference position; and voltage detecting means for detecting the voltage of said coil produced by said current to position the movable member at said reference position, wherein said voltage directly corresponds to the differential of acceleration.

30. A control system for controlling a force on a movable body, comprising:

means for directly detecting a differential of acceleration from movement of said movable body;

a closed control loop having a feedback path and means for supplying to said feedback path a value derived by multiplying a value of differential of acceleration from said detecting means by a gain; and means responsive to said closed control loop for controlling a force on said movable body.

31. A control system according to claim 30, wherein said detecting means is a sensor comprising:

electromagnetic force generating means having a coil and a magnet;

a movable member driven by said electromagnetic force generating means;

displacement detecting means for detecting the displacement of said movable member;

current supply means for supplying current to said coil of said electromagnetic force generating means on the basis of output of said displacement detection means so that said movable member is positioned at a reference position; and voltage detecting means for detecting the voltage of said coil produced by said current to position the movable member at said reference position, wherein said voltage directly corresponds to the differential of acceleration.

32. A control system for controlling a movable object, comprising:

a sensor for directly measuring a first value representing an acceleration of said movable object and a second value representing a differential of acceleration of said movable object;

means for generating a movement comfort evaluation factor using both said first value and said second value; and means for controlling movement of said object using said movement comfort evaluation factor.

33. A control system according to claim 32, wherein said sensor comprises:

electromagnetic force generating means having a coil and a magnet;

a movable member driven by said electromagnetic force generating means;

displacement detecting means for detecting the displacement of said movable member;

current supply means for supplying current to said coil of said electromagnetic force generating means on the basis of output of said displacement detection means so that said movable member is positioned at a reference position; and voltage detecting means for detecting the voltage of said coil produced by said current to position the movable member at said reference position, wherein said voltage directly corresponds to the differential of acceleration.

34. A control system according to claim 32, wherein said movable object is an automobile engine, and said movement controlling means is means for controlling a suspension for said engine.

35. A control system according to claim 32, wherein said movable object is an elevator cage, and said movement controlling means is a drive system for said elevator cage.

36. A control system according to claim 32, wherein said movable object is a vibration stage, and said movement controlling means comprises means for controlling actuators for said vibration stage.

* * * * *